US008865342B2

(12) United States Patent
Monden et al.

(10) Patent No.: US 8,865,342 B2
(45) Date of Patent: Oct. 21, 2014

(54) POLYCARBONATE RESIN COMPOSITION AND MOLDED ARTICLE

(75) Inventors: Toshiki Monden, Hiratsuka (JP); Yutaka Shiraishi, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 280 days.

(21) Appl. No.: 13/576,118

(22) PCT Filed: Nov. 15, 2011

(86) PCT No.: PCT/JP2011/076298
§ 371 (c)(1),
(2), (4) Date: Jul. 30, 2012

(87) PCT Pub. No.: WO2012/067108
PCT Pub. Date: May 24, 2012

(65) Prior Publication Data
US 2012/0301766 A1 Nov. 29, 2012

(30) Foreign Application Priority Data

Nov. 17, 2010 (JP) ................................. 2010-256620
Dec. 24, 2010 (JP) ................................. 2010-287163

(51) Int. Cl.
*H01M 2/02* (2006.01)
*C08L 69/00* (2006.01)
*C08K 5/523* (2006.01)
*C08K 5/5399* (2006.01)
*C08K 5/42* (2006.01)

(52) U.S. Cl.
CPC ..................................... *C08L 69/00* (2013.01)
USPC ............. 429/163; 429/176; 524/95; 524/125; 524/165; 524/504

(58) Field of Classification Search
USPC ............ 429/100, 163, 176; 524/95, 165, 127, 524/504
See application file for complete search history.

(56) References Cited

U.S. PATENT DOCUMENTS

| 6,342,550 | B1 | 1/2002 | Ishii et al. |
| 7,094,818 | B2 | 8/2006 | Lim et al. |
| 2005/0281999 | A1* | 12/2005 | Hofmann et al. ........... 428/304.4 |
| 2007/0213237 | A1* | 9/2007 | Scherer et al. ............... 508/469 |
| 2009/0105438 | A1* | 4/2009 | Brack et al. .................. 526/314 |
| 2009/0186966 | A1* | 7/2009 | Gallucci et al. ................ 524/96 |

FOREIGN PATENT DOCUMENTS

| CN | 101684194 A | 3/2010 |
| EP | 0 207 359 A2 | 1/1987 |
| JP | 54-32456 B2 | 10/1979 |
| JP | 62-4746 A | 1/1987 |
| JP | 10-46015 A | 2/1998 |
| JP | 10-120893 A | 5/1998 |
| JP | 11-21441 A | 1/1999 |
| JP | 11-140295 A | 5/1999 |
| JP | 2000-169696 A | 6/2000 |
| JP | 2000-290487 A | 10/2000 |
| JP | 2003-261629 A | 9/2003 |
| JP | 2009-203269 A | 9/2009 |
| JP | 2010-70715 A | 4/2010 |
| JP | 2010-150301 A | 7/2010 |
| WO | WO 2012/081391 A1 | 6/2012 |

OTHER PUBLICATIONS

Machine Translation of: JP 2010-150301A, Ishikawa et al., Jul. 8, 2010.*
International Preliminary Report on Patentability (Forms PCT/IB/338; PCT/IB/373; PCT/ISA/237 and PCT/IB/326) for PCT/JP2011/076298 dated Jun. 20, 2013.
Chinese Office Action for Chinese Application No. 201180007809.1, issued May 30, 2013 with English translation.
Extended European Search Report for European Application No. 11841764.1, dated Jun. 24, 2013.
European Office Action (Communication pursuant to Article 94(3) EPC dated Feb. 5, 2014 in corresponding European Patent Application No. 11 841 764.1.
International Search Report issued in PCT/JP2011/076298, mailed on Dec. 20, 2011.
Notice of Allowance of Japanese Application No. 2011-554325, dated Apr. 17, 2012.
Notice of Reasons for Refusal of Japanese Application No. 2011-554325, dated Feb. 28, 2012.

* cited by examiner

*Primary Examiner* — Kenneth Douyette
(74) *Attorney, Agent, or Firm* — Birch, Stewart, Kolasch & Birch, LLP

(57) ABSTRACT

Provided a polycarbonate resin composition excellent in flame resistance, impact resistance, and color fastness. A polycarbonate resin composition containing, per 100 parts by mass of polycarbonate resin (A), 0.001 to 30 parts by mass of flame retardant (B), 0.001 to 1 part by mass of fluoropolymer (C), and 0.5 to 10 parts by mass of graft copolymer (D) obtainable by graft-copolymerizing a diene-based rubber with a (meth)acrylate ester compound, the graft copolymer (D) having (i) a sulfur content of 100 to 1500 ppm, and (ii) an average particle size of 70 to 240 nm.

20 Claims, No Drawings

POLYCARBONATE RESIN COMPOSITION AND MOLDED ARTICLE

BACKGROUND OF THE INVENTION

1. Field of the Invention

The present invention relates to a polycarbonate resin composition, and more specifically to a polycarbonate resin composition excellent in flame resistance, impact resistance, hue, and color fastness, and a molded article obtained by molding the same.

2. Description of the Related Art

Polycarbonate resin is excellent in heat resistance, mechanical performances, and electrical characteristics, and has widely been used for example in automotive materials, materials of electric/electronic instruments, housing materials, and materials for manufacturing components in other industrial fields. In particular, flame retardant polycarbonate resin composition is preferably used as components of OA and information appliances such as computer, notebook-sized personal computer, mobile phone, printer, and copying machine.

The polycarbonate resin has been given flame resistance by adding thereto a halogen-containing flame retardant or phosphorus-containing flame retardant.

A known example of the polycarbonate resin composition added with a phosphorus-containing flame retardant is disclosed in Patent Document 1. The technique of adding a phosphorus-containing flame retardant to the polycarbonate resin might have been successful in achieving a high level of flame resistance and an excellent fluidity, but has been suffering from considerable degradation in the impact resistance which polycarbonate resin inherently possesses.

There have therefore been vigorous efforts of improving the impact resistance by further adding an elastomer. Among others, the impact resistance may be improved effectively by using a graft copolymer composed of a rubber-like polymer and a monomer polymerizable therewith, and more preferably a core/shell type graft copolymer composed of a core made of a rubber-like polymer and a shell made of a polymerizable monomer. (See Patent Document 2, for example).

Other proposals relate to resin compositions which contain a graft copolymer having a core made of a polyorganosiloxane-butyl acrylate-based rubber and a shell made of acrylonitrile and styrene, and having an average particle size of 0.1 to 0.2 μm; or a graft copolymer having a core made of butadiene-unsaturated carboxylic acid alkyl ester-aromatic vinyl-based rubber and a shell made of styrene and methyl acrylate, and having an average particle size of 100 to 180 nm (see Patent Documents 3 to 5).

These sorts of graft copolymers are, however, readily combustible, so that the polycarbonate resins added with the phosphorus-containing flame retardant, and further with the graft copolymer, were considerably degraded in the flame resistance.

In particular, since the graft copolymer is generally known to be more combustible as compared with the polycarbonate resin, so that the composition which contains the polycarbonate resin together with the graft copolymer has been suffering from considerable increase in heat generation rate. This means not only that the composition violently combusts when ignited and highly endangers people therearound, but also that the composition is likely to spread fire in case of fire accident. It is therefore a strong social need for material having an excellent flame resistance conforming to UL94, and a small heat generation rate.

On the other hand, recent vigorous investigations has been directed to metal organosulfonate compound represented by alkali metal organosulfonate compound and organoalkaline earth metal salt compound, as useful flame retardants (see Patent Documents 6 and 7, for example).

Also for this case, further addition of an elastomer has been discussed aiming at improving the impact resistance (see Patent Document 8, for example). Among others, diene-based rubber has been used as the elastomer, by virtue of a good balance between impact, resistance and flame resistance.

The diene-based rubber is, however, readily colored due to oxidative degradation. The above-described resin compositions having been used were poor in hue, and were more likely to cause yellowing, when they were molded and used as components which are succeedingly exposed to heat.

The resin compositions were also likely to cause yellowing even in pre-drying before molding. In order to obtain the molding with a good hue, it has therefore been necessary to strictly control the drying time, which has considerably degraded the continuous productivity in practice.

Moreover, the above-described graft copolymers having been used were likely to discolor due to heat in the process of pellet making or molding, so that the above-described resin compositions have often been suffering from poor hue, and also from tendency of discoloration due to prolonged exposure to heat after being molded.

PRIOR ART DOCUMENTS

Patent Document

[Patent Document 1] JP-A-62-4746
[Patent Document 2] JP-A-11-21441
[Patent Document 3] JP-A-10-120893
[Patent Document 4] JP-A-11-140295
[Patent Document 5] JP-A-2009-203269
[Patent Document 6] JP-B-54-32456
[Patent Document 7] JP-A-2000-169696
[Patent Document 8] JP-A-2000-290487

SUMMARY OF THE INVENTION

Problems to be Solved by the Invention

It is therefore a first object of the present invention to provide a polycarbonate resin composition excellent in flame resistance, impact resistance, hue and color fastness; and a molded article obtained by molding the same.

It is therefore a second object of the present invention to provide a polycarbonate resin composition excellent in flame resistance, fire retardant property, impact resistance, hue and color fastness, while successfully keeping fluidity of polycarbonate resin improved in the flame resistance by adding a phosphorus-containing flame retardant, and also excellent in impact resistance in the process of high temperature molding; and a molded article obtained by molding the same.

It is therefore a third object of the present invention to provide a polycarbonate resin composition very excellent in flame resistance when given in a form of thin molded article, and also excellent in impact resistance, hue, color fastness and continuous productivity, without using any halogen-containing flame retardant and phosphorus-containing flame retardant which are causative of high environmental load and hazardous to human health.

Means for Solving the Problems

Considering the above-described situation, the present inventors found out that the problems described in the above may successfully be solved by using a graft copolymer which satisfies specific conditions, irrespective of types of flame retardant to be adopted. More specifically, the present inventors found out that the above-described problems may be solved by the means <1> below, and preferably the means <2> to <14> below.

<1> A polycarbonate resin composition containing, per 100 parts by mass of polycarbonate resin (A), 0.001 to 30 parts by mass of flame retardant (B), 0.001 to 1 part by mass of fluoropolymer (C), and 0.5 to 10 parts by mass of graft copolymer (D) obtainable by graft-copolymerizing a diene-based rubber with, the graft copolymer (D) having (i) a sulfur content of 100 to 1500 ppm, and (ii) an average particle size of 70 to 240 nm.

<2> The polycarbonate resin composition of <1>,
wherein, in the graft copolymer (D), content of a butadiene-derived component in the diene-based rubber is 80% by mass or more.

<3> The polycarbonate resin composition of <1> or <2>,
wherein 1 to 10 parts by mass of the graft copolymer (D) is contained per 100 parts by mass of polycarbonate resin.

<4> The polycarbonate resin composition of any one of <1> to <3>,
wherein sulfur content of the graft copolymer (D) is 300 to 800 ppm.

<5> The polycarbonate resin composition of any one of <1> to <4>,
containing 3 to 30 parts by mass of phosphorus-containing flame retardant (B-1) as the flame retardant, per 100 parts by mass of polycarbonate resin (A).

<6> The polycarbonate resin composition of <5>,
wherein the phosphorus-containing flame retardant (B-1) is represented by the formula (1) below:

[Chemical Formula 1]

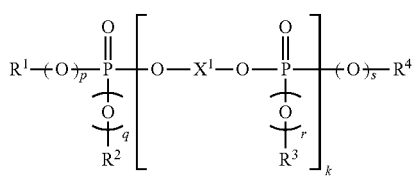

[in the formula (1), each of $R^1$, $R^2$, $R^3$ and $R^4$ independently represents a $C_{1-6}$ alkyl group or a $C_{6-20}$ aryl group which may be substituted by an alkyl group, each of p, q, r and s independently represents 0 or 1, k is an integer of 1 to 5, and $X^1$ represents an arylene group.]

<7> The polycarbonate resin composition of <5>,
wherein the phosphorus-containing flame retardant (B-1) is a phosphazene compound represented by the formulae (2) and/or (3) below:

[Chemical Formula 2]

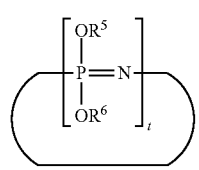

[in the formula (2), t is an integer of 3 to 25, $R^5$ and $R^6$ may be same or different, and each of which represents an aryl group or alkylaryl group],

[Chemical Formula 3]

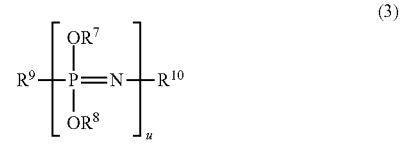

[in the formula (3), u is an integer of 3 to 10,000, $R^7$ represents at least one species selected from —N=P(OR$^7$)$_3$ group, —N=P(OR$^8$)$_3$ group, —N=P(O)OR$^7$ group and —N=P(O)OR$^8$ group, and $R^{10}$ represents at least one species selected from —P(OR$^7$)$_4$ group, —P(OR$^8$)$_4$ group, —P(O)(OR$^7$)$_2$ group and —P(O)(OR$^8$)$_2$ group. $R^7$ and $R^8$ may be same or different, and each of which represents an aryl group or alkylaryl group.]

<8> The polycarbonate resin composition of any one of <1> to <4>,
containing 0.001 to 1 part by mass of metal organosulfonate (B-2) as the flame retardant, per 100 parts by mass of polycarbonate resin (A).

<9> The polycarbonate resin composition of <8>,
wherein the metal organosulfonate (B-2) is an alkali metal salt of fluorine-containing aliphatic sulfonic acid.

<10> The polycarbonate resin composition of <8> or <9>,
wherein the metal organosulfonate (B-2) is an alkali metal salt of perfluoroalkanesulfonic acid.

<11> The polycarbonate resin composition of any one of <1> to <10>,
wherein average particle size of the graft copolymer (D) is 100 to 180 nm.

<12> The polycarbonate resin composition of any one of <1> to <11>,
wherein graft copolymer (D) is obtainable by graft-copolymerizing a diene-based rubber with a methyl methacrylate.

<13> A molded article obtainable by molding the polycarbonate resin composition described in any one of <1> to <12>.

<14> The molded article of <13>, being a battery pack container.

BEST MODES FOR CARRYING OUT THE INVENTION

The present invention will be detailed below, referring to specific embodiments and exemplary articles. The present invention is, however, limited neither to the embodiments nor exemplary articles described below, and may be modified without departing from the spirit of the present invention. Note that, in this specification, the term "to" used together with the preceding and succeeding numerals will indicate a numerical range including the numerals as the lower limit value and the upper limit value.

[1. Outline]

The polycarbonate resin composition of the present invention contains, at least, a resin composition composed of a polycarbonate resin and a flame retardant and a fluoropolymer, added with a graft copolymer having a specific sulfur content and a specific average particle size. The polycarbonate resin composition of the present invention may contain other ingredients depending on needs.

By adding the graft copolymer having a specific sulfur content and a specific average particle size, into a resin composition composed of a polycarbonate resin and a flame retardant and a fluoropolymer, it now becomes possible to distinctively improve the flame resistance, impact resistance, hue and color fastness.

In particular, by adding a graft copolymer having a specific sulfur content and a specific average particle size, into a resin composition composed of a polycarbonate resin and a phosphorus-containing flame retardant and a fluoropolymer, the impact resistance in the process of high temperature molding, in addition to the effect described in the above, is distinctively improved.

On the other hand, by adding a graft copolymer having a specific sulfur content and a specific average particle size, into a resin composition composed of a polycarbonate resin and a metal organosulfonate and a fluoropolymer, the continuous productivity, in addition to the effect described in the above, is distinctively improved.

[2. Polycarbonate Resin (A)]

Species of the polycarbonate resin used for the polycarbonate resin composition of the present invention is not specifically limited. The polycarbonate resin used herein may be a single species, or an arbitrary combination of two or more species according to an arbitrary ratio of mixing.

The polycarbonate resin in the present invention is a polymer of a basic structure having a carbonate bond represented by the formula (4) below:

[Chemical Formula 4]

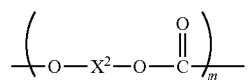

(4)

In the formula (4), $X^2$ generally represents a hydrocarbon, which may have a hetero atom or hetero bond introduced therein for expectations of various characteristics.

The polycarbonate resin may be classified into aromatic polycarbonate resin having an aromatic carbon directly bound to the carbonate bond, and an aliphatic polycarbonate resin having an aliphatic carbon directly bound to the carbonate bond, and both may be adoptable. From the viewpoints of heat resistance, mechanical performances, electrical characteristics and so forth, the aromatic polycarbonate resin is particularly preferable.

While species of the polycarbonate resin is not specifically limited, it may be exemplified by polycarbonate polymer obtained by allowing a dihydroxy compound and a carbonate precursor to react with each other. In this process, a polyhydroxy compound for example may be reacted, in addition to the dihydroxy compound and the carbonate precursor. Alternatively, carbon dioxide may be used as the carbonate precursor, so as to be reacted with a cyclic ether. The polycarbonate polymer may have a form of straight chain or branched chain. The polycarbonate polymer may be a homopolymer composed of a single species of repeating unit, or may be a copolymer composed of two or more species of repeating unit. The copolymer may be selectable from various types including random copolymer, block copolymer an so forth. This sort of polycarbonate polymer is generally given as a thermoplastic resin.

Of monomers which may be used as the source materials of the aromatic polycarbonate resin, examples of aromatic dihydroxy compound include, dihydroxybenzenes such as 1,2-dihydroxybenzene, 1,3-dihydroxybenzene (or, resorcinol), and 1,4-dihydroxybenzene;

dihydroxybiphenyls such as 2,5-dihydroxybiphenyl, 2,2'-dihydroxybiphenyl, and 4,4'-dihydroxybiphenyl;

dihydroxynaphthalenes such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene, and 2,7-dihydroxynaphthalene;

dihydroxy diaryl ethers such as 2,2'-dihydroxy diphenyl ether, 3,3'-dihydroxy diphenyl ether, 4,4'-dihydroxy diphenyl ether, 4,4'-dihydroxy-3,3'-dimethyldiphenyl ether, 1,4-bis(3-hydroxyphenoxy)benzene, and 1,3-bis(4-hydroxyphenoxy)benzene;

bis(hydroxyaryl)alkanes such as 2,2-bis(4-hydroxyphenyl)propane (or, bisphenol A), 1,1-bis(4-hydroxyphenyl)propane, 2,2-bis(3-methyl-4-hydroxyphenyl)propane, 2,2-bis(3-methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(4-hydroxy-3,5-dimethylphenyl)propane, 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,3-bis[2-(4-hydroxyphenyl)-2-propyl]benzene, bis(4-hydroxyphenyl)methane, bis(4-hydroxyphenyl)cyclohexylmethane, bis(4-hydroxyphenyl)phenylmethane, bis(4-hydroxyphenyl)(4-propenylphenyl)methane, bis(4-hydroxyphenyl)diphenylmethane, bis(4-hydroxyphenyl)naphthylmethane, 1-bis(4-hydroxyphenyl)ethane, 2-bis(4-hydroxyphenyl)ethane, 1,1-bis(4-hydroxyphenyl)-1-phenylethane, 1,1-bis(4-hydroxyphenyl)-1-naphthylethane, 1-bis(4-hydroxyphenyl)butane, 2-bis(4-hydroxyphenyl)butane, 2,2-bis(4-hydroxyphenyl)pentane, 1,1-bis(4-hydroxyphenyl)hexane, 2,2-bis(4-hydroxyphenyl)hexane, 1-bis(4-hydroxyphenyl)octane, 2-bis(4-hydroxyphenyl)octane, 1-bis(4-hydroxyphenyl)hexane, 2-bis(4-hydroxyphenyl)hexane, 4,4-bis(4-hydroxyphenyl)heptane, 2,2-bis(4-hydroxyphenyl)nonane, 10-bis(4-hydroxyphenyl)decane, and 1-bis(4-hydroxyphenyl)dodecane;

bis(hydroxyaryl)cycloalkanes such as 1-bis(4-hydroxyphenyl)cyclopentane, 1-bis(4-hydroxyphenyl)cyclohexane, 4-bis(4-hydroxyphenyl)cyclohexane, 1,1-bis(4-hydroxyphenyl)-3,3-dimethylcyclohexane, 1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butyl-cyclohexane, 1,1-bis(4-hydroxyphenyl)-3-tert-butyl-cyclohexane, 1,1-bis(4-hydroxyphenyl)-3-phenylcyclohexane, and 1,1-bis(4-hydroxyphenyl)-4-phenylcyclohexane;

cardo structure-containing bisphenols such as 9,9-bis(4-hydroxyphenyl)fluorene, and 9,9-bis(4-hydroxy-3-methylphenyl)fluorene;

dihydroxydiaryl sulfides such as 4,4'-dihydroxydiphenyl sulfide, and 4,4'-dihydroxy-3,3'-dimethyldiphenyl sulfide;

dihydroxydiaryl sulfoxides such as 4,4'-dihydroxydiphenyl sulfoxide, and 4,4'-dihydroxy-3,3'-dimethyldiphenyl sulfoxide; and dihydroxydiaryl sulfones such as 4,4'-dihydroxydiphenyl sulfone, and 4,4'-dihydroxy-3,3'-dimethyldiphenyl sulfone.

Among them, bis(hydroxyaryl)alkanes are particularly preferable, bis(4-hydroxyphenyl)alkanes are more preferable, and 2,2-bis(4-hydroxyphenyl)propane (or, bisphenol A) is particularly preferable, from the viewpoints of impact resistance and heat resistance.

The aromatic dihydroxy compound used herein may be a single species, or an arbitrary combination of two or more species according to an arbitrary ratio of mixing.

Examples of monomers which may be used as source materials of the aliphatic polycarbonate resin include alkane diols such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol, and decane-1,10-diol;

cycloalkane diols such as cyclopentane-1,2-diol, cyclohexane-1,2-diol, cyclohexane-1,4-diol, 1,4-cyclohexane dimethanol, 4-(2-hydroxyethyl)cyclohexanol, and 2,2,4,4-tetramethyl-cyclobutane-1,3-diol;

glycols such as 2,2'-oxydiethanol (or, ethylene glycol), diethylene glycol, triethylene glycol, propylene glycol, and spiroglycol;

alalkyl diols such as 1,2-benzene dimethanol, 1,3-benzene dimethanol, 1,4-benzene dimethanol, 1,4-benzene diethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyl dimethanol, 4,4'-biphenyl diethanol, 1,4-bis(2-hydroxyethoxy)biphenyl, bisphenol A bis(2-hydroxyethyl)ether, and bisphenol S bis(2-hydroxyethyl)ether; and cyclic ethers such as 1,2-epoxyethane (or, ethylene oxide), 1,2-epoxypropane (or, propylene oxide), 1,2-epoxycyclopentane, 1,2-epoxycyclohexane, 1,4-epoxycyclohexane, 1-methyl-1,2-epoxycyclohexane, 2,3-epoxynorbornane, and 1,3-epoxypropane.

Of monomers which may be used as source materials of the aromatic polycarbonate resin, examples of the carbonate precursor include carbonyl halide, and carbonate ester. The carbonate precursor used herein may be a single species, or an arbitrary combination of two or more species according to an arbitrary ratio of mixing.

Specific examples of carbonyl halide include phosgene; and haloformates such as bischloroformate of dihydroxy compound and monochloroformate of dihydroxy compound.

Specific examples of the carbonate ester include diaryl carbonates such as diphenyl carbonate and ditolyl carbonate; dialkyl carbonates such as dimethyl carbonate and diethyl carbonate; carbonates of dihydroxy compounds such as bis carbonate of dihydroxy compound, mono carbonate of dihydroxy compound, and cyclic carbonate.

Method of Producing Polycarbonate Resin

Method of producing polycarbonate resin adoptable herein may arbitrarily be selected, without special limitation. Examples of the method include interfacial polymerization process, melt ester interchange process, pyridine process, ring-opening polymerization of cyclic carbonate compound, and solid-phase ester interchange process of prepolymer. Among them, those particularly preferable will be detailed below.

Interfacial Polymerization Process

Production of the polycarbonate resin by the interfacial polymerization process will be explained first. In the interfacial polymerization process, the polycarbonate resin may be obtained by allowing a dihydroxy compound and a carbonate precursor (preferably, phosgene) to react under the presence of an inert organic solvent and an aqueous alkali solution, while generally keeping pH at 9, and then by allowing interfacial polymerization to proceed under the presence of a polymerization catalyst. The reaction system may contain a molecular weight modifier (terminator) depending on needs, and an antioxidant for preventing oxidation of the dihydroxy compound.

The dihydroxy compound and the carbonate precursor are the same as described in the above. Among the carbonate precursor, phosgene is preferably used. The method of production using phosgene is specifically called "the phosgene process".

Examples of the inert organic solvent include chlorinated hydrocarbons such as dichloromethane, 1,2-dichloroethane, chloroform, monochlorobenzene and dichlorobenzene; and aromatic hydrocarbons such as benzene, toluene and xylene. The organic solvent used herein may be a single species, or an arbitrary combination of two or more species according to an arbitrary ratio of mixing.

Examples of alkali compound contained in the aqueous alkali solution include alkali metal compounds such as sodium hydroxide, potassium hydroxide, lithium hydroxide and sodium hydrogen carbonate; and alkali earth metal compounds. Among them, sodium hydroxide and potassium hydroxide are preferable. The alkali compound used herein may be a single species, or an arbitrary combination of two or more species according to an arbitrary ratio of mixing.

While concentration of the alkali compound in the aqueous alkali solution is not specifically limited, it is generally adjusted to 5 to 10% by mass, in order to control pH of the aqueous alkali solution during the reaction to 10 to 12. For an exemplary case where phosgene is blown into the solution, molar ratio of the bisphenol compound and the alkali compound is generally adjusted to 1:1.9 or larger, preferably 1:2.0 or larger, on the other hand, generally 1:3.2 or smaller, and preferably 1:2.5 or smaller, in order to control pH of the aqueous phase to 10 to 12, and more preferably to 10 to 11.

Examples of the polymerization catalyst include aliphatic tertiary amines such as trimethylamine, triethylamine, tributyl amine, tripropylamine, and trihexylamine; alicyclic tertiary amines such as N,N'-dimethylcyclohexylamine, and N,N'-diethylcyclohexylamine; aromatic tertiary amines such as alicyclic tertiary amine; quaternary ammonium salts such as trimethylbenzylammonium chloride, tetramethylammonium chloride, and triethylbenzylammonium chloride; pyridine; guanine; and salt of guanidine. The polymerization catalyst used herein may be a single species, or an arbitrary combination of two or more species according to an arbitrary ratio of mixing.

Examples of the molecular weight modifier include aromatic phenols having monovalent phenolic hydroxy group; aliphatic alcohols such as methanol and butanol; mercaptan; and phthalimide. Among them, aromatic phenols are preferable. Examples of the aromatic phenols include alkyl group substituted phenols such as m-methylphenol, p-methylphenol, m-propylphenol, p-propylphenol, p-tert-butyl phenol, and p-(long chain alkyl) substituted phenol; vinyl group-containing phenol such as isopropanyl phenol; epoxy group-containing phenol; and carboxyl group-containing phenols such as O-oxybenzoic acid, 2-methyl-6-hydroxyphenylacetic acid. The molecular weight modifier used herein may be a single species, or an arbitrary combination of two or more species according to an arbitrary ratio of mixing.

Amount of use of the molecular weight modifier is generally 0.5 mol or more per 100 mol of dihydroxy compound, and preferably 1 mol or more, on the other hand, generally 50 mol or less, and preferably 30 mol or less. By adjusting the amount of use to the above-described ranges, the polycarbonate resin composition will be improved in the thermal stability and hydrolytic resistance.

The order of mixing the reaction substrate, reaction medium, catalyst and additive is arbitrary, so long as a desired polycarbonate resin may be obtained, and may appropriately be determined. For an exemplary case where phosgene is used as the carbonate precursor, the molecular weight modifier may be added at an arbitrary time between the reaction of the dihydroxy compound with phosgene (phosgenation) and the start of polymerization reaction.

Reaction temperature is generally set to 0 to 40° C., and reaction time is generally set to several minutes (10 minutes, for example) to several hours (6 hours, for example).

Melt Ester Interchange Process

Next, production of the polycarbonate resin by the melt ester interchange process will be explained. In the melt ester interchange process, for example, an ester interchange reaction between a diester carbonate and the dihydroxy compound is proceeded.

The dihydroxy compound are same as described in the above.

On the other hand, the diester carbonate is exemplified by dialkyl carbonate compounds such as dimethyl carbonate, diethyl carbonate, and di-tert-butyl carbonate; diphenyl carbonate; and substituted diphenyl carbonate such as ditolyl carbonate. Among them, diphenyl carbonate and substituted diphenyl carbonate are preferable, and diphenyl carbonate is particularly preferable. The diester carbonate used herein may be a single species, or an arbitrary combination of two or more species according to an arbitrary ratio of mixing.

Ratio of the dihydroxy compound and the diester carbonate is arbitrary so long as a desired polycarbonate resin may be obtained, wherein it is preferable to use the dihydroxy compound and an equivalent morality of diester carbonate, and use of 1.01 mol or more of diester carbonate per 1 mol of the dihydroxy compound is more preferable. The upper limit is generally 1.30 mol or less. By adjusting the amount of use to the above-described ranges, the amount of terminal hydroxy group is adjustable within a preferable range.

In the polycarbonate resin, the amount of terminal hydroxy group tends to largely affect the thermal stability, hydrolytic stability, and hue. Accordingly, the amount of terminal hydroxy group may be adjusted, as required, by an arbitral publicly-known method. In the ester interchange reaction, the polycarbonate resin having an appropriately adjusted amount of terminal hydroxy group may be obtained, generally by adjusting the ratio of mixing of the diester carbonate and the aromatic dihydroxy compound, and the degree of reduction in pressure. By the operation, it is generally possible to adjust the molecular weight of the resultant polycarbonate resin.

For the case where the amount of terminal hydroxy group is controlled by adjusting the ratio of mixing of the diester carbonate and the dihydroxy compound, the ratio of mixing is as described in the above.

A more intentional method of control is exemplified by addition of a terminator in the process of reaction. Example of the terminator used herein include monovalent phenols, monovalent carboxylic acids, and diester carbonates. The terminator used herein may be a single species, or an arbitrary combination of two or more species according to an arbitrary ratio of mixing.

For the case where the polycarbonate resin is produced by the melt ester interchange process, an ester interchange catalyst is generally used. The ester interchange catalyst used herein may be arbitrary. Among others, alkali metal compound and/or alkali earth metal compound are preferably used. Alternatively, it is also preferable to use an auxiliary basic compound such as basic boron compound, basic phosphorus compound, basic ammonium compound, and amine-based compound. The ester interchange catalyst used herein may be a single species, or an arbitrary combination of two or more species according to an arbitrary ratio of mixing.

In the melt ester interchange process, reaction temperature is generally set to 100 to 320° C. The reaction is allowed to proceed generally under a reduced pressure of 2 mmHg or lower. More specifically, the melt polycondensation reaction may be proceeded under the conditions described in the above, while removing byproducts such as aromatic hydroxy compound.

The melt polycondensation reaction may be implemented by either of the batch scheme and the continuous scheme. When the batch scheme is adopted, the order of mixing of the reaction substrate, reaction medium, catalyst, additive and so forth may be arbitrary, so long as a desired aromatic polycarbonate resin may be obtained, and may appropriately be determined. It is, however, preferable to proceed the melt polycondensation reaction according to the continuous scheme, taking stability of the polycarbonate resin and the polycarbonate resin composition into account.

In the melt ester interchange process, a catalyst deactivator may be used if necessary. The catalyst deactivator used herein is an arbitrary compound capable of neutralizing the ester interchange catalyst. Examples of the catalyst deactivator include sulfur-containing acidic compound and derivatives thereof. The catalyst deactivator used herein may be a single species, or an arbitrary combination of two or more species according to an arbitrary ratio of mixing.

Amount of use of the catalyst deactivator is generally 0.5 equivalents or more relative to the alkali metal or alkali earth metal contained in the ester interchange catalyst, preferably 1 equivalent or more, on the other hand, generally 10 equivalents or less, and preferably 5 equivalents or less. In addition, it is generally 1 ppm or more relative to the aromatic polycarbonate resin, and generally 100 ppm or less, and preferably 20 ppm or less.

Other Notices for Polycarbonate Resin

While molecular weight of the polycarbonate resin is arbitrary, and may appropriately be selected and determined, viscosity average molecular weight [Mv] calculated based on viscosity of the solution is generally 10,000 or larger, preferably 16,000 or larger, and more preferably 17,000 or larger, on the other hand, generally 40,000 or smaller, preferably 30,000 or smaller, and more preferably 24,000 or smaller. By adjusting the viscosity average molecular weight to the above-described lower limit value or larger, the polycarbonate resin composition of the present invention will further be improved in the mechanical strength, making it more preferably adoptable to applications with higher demands of on the mechanical strength. On the other hand, by adjusting the viscosity average molecular weight to the above-described upper limit value or smaller, the polycarbonate resin composition of the present invention will be improved so as to suppress lowering in the fluidity, and will be improved in moldability to thereby facilitate the molding process. Two or more species of polycarbonate resin having different values of viscosity average molecular weight may be used in a mixed manner, wherein the polycarbonate resin to be mixed may have the viscosity average molecular weight out of the above-described preferable ranges.

The viscosity average molecular weight [Mv] herein means a value calculated using $\eta = 1.23 \times 10^{-4} Mv^{0.83}$, known as the Schnell's equation, where intrinsic viscosity $[\eta]$ (dl/g) is determined by using methylene chloride as a solvent and a Ubbelohde viscometer at 20° C. The intrinsic viscosity $[\eta]$ herein is calculated by the formula below, using values of specific viscosity [$\eta_{sp}$] measured while varying the concentration of solution [C] (g/dl).

$$\eta = \lim_{c \to 0} \eta_{sp}/c \qquad \text{[Mathematical Formula 1]}$$

Terminal hydroxy group concentration of the polycarbonate resin is arbitrary, and may appropriately be selected and determined, wherein it is generally 1,000 ppm or less, preferably 800 ppm or less, and more preferably 600 ppm or less, thereby the polycarbonate resin composition of the present invention will be further improved in the residence thermal stability and the hue. The lower limit value, especially for the polycarbonate resin produced by the melt ester interchange process, is generally 10 ppm or more, preferably 30 ppm or more, and more preferably 40 ppm or more. By the adjustment, the polycarbonate resin composition of the present invention will be suppressed from lowering in the molecular weight, and will further be improved in the mechanical characteristics.

Note that the terminal hydroxy group concentration herein is given in "ppm", based on the weight of terminal hydroxy group relative to the weight of polycarbonate resin. The concentration was measured by colorimetric analysis based on the titanium tetrachloride/acetic acid method (*Macromol. Chem.*, 88, 215(1965)).

The polycarbonate resin may be used alone by itself ("polycarbonate resin alone by itself" herein means not only an embodiment having only a single species of polycarbonate resin contained therein, but also an embodiment having a plurality of species of polycarbonate resin differing in the monomer composition and/or molecular weight contained therein), or may be used in combination with an alloy (mixture) composed of polycarbonate resin and other thermoplastic resin. In addition, the polycarbonate resin may be configured as various copolymers mainly composed of polycarbonate resin, examples of which include copolymer having oligomer or polymer which contains a siloxane structure, aimed at further improving the flame resistance and/or impact resistance; copolymer having monomer, oligomer or polymer which contains phosphorus atom, aimed at further improving the thermal oxidation stability and/or flame resistance; copolymer having monomer, oligomer or polymer which contains a dihydroxyanthraquinone structure, aimed at improving the thermal oxidation stability; copolymer having oligomer or polymer which contains an olefin-based structure, aimed at improving optical performances; and copolymer having polyester resin oligomer or polymer, aimed at improving chemical resistance.

For the purpose of improving appearance of molded article or fluidity, the polycarbonate resin may contain a polycarbonate oligomer. Viscosity average molecular weight [Mv] of the polycarbonate oligomer is generally 1,500 or larger, and preferably 2,000 or larger, on the other hand, generally 9,500 or smaller, and preferably 9,000 or smaller. Content of the polycarbonate oligomer to be contained herein is preferably 30% by mass or less of the polycarbonate resin (the polycarbonate oligomer inclusive).

The polycarbonate resin is available not only as a virgin material, but also a polycarbonate resin regenerated from used products (so-called "recycled polycarbonate resin"). Examples of the used products include optical recording media such as optical disk; light guide plate; vehicle transparent components such as vehicle window glass, lens of vehicle headlamp, and windshield; containers such as water bottle; spectacle lens; and building materials such as soundwall, glass window and corrugated sheet. Crushed products of nonconforming items, sprue, runner and so forth, and pellet obtained by melting them are also adoptable.

Note, however, that the regenerated polycarbonate resin preferably accounts for 80% by mass or less of the polycarbonate resin contained in the polycarbonate resin composition of the present invention, and more preferably 50% by mass or less. This is because the regenerated polycarbonate resin is highly probable to cause heat deterioration or time-dependent deterioration, and that the content of the polycarbonate resin exceeding the above-described range may degrade the hue and mechanical performances.

The polycarbonate resin composition of the present invention contains the polycarbonate resin (A) as a major constituent, where the content of the polycarbonate resin (A) in the polycarbonate resin composition is preferably 75% by mass or more.

[3. Flame Retardant (B)]

The polycarbonate resin composition of the present invention contains 0.001 to 30 parts by mass of flame retardant (B), per 100 parts by mass of the polycarbonate resin (A). By containing the flame retardant, the polycarbonate resin composition of the present invention will be improved in the flame resistance.

Amount of addition of the flame retardant is preferably 0.01 to 20 parts by mass, per 100 parts by mass of polycarbonate resin (A).

Species of the flame retardant is not specifically limited, wherein preferable examples thereof include phosphorus-containing flame retardant, metal organosulfonate, silicon-containing flame retardant, boron-containing flame retardant, nitrogen-containing flame retardant, and silicate-containing flame retardant. Among them, the phosphorus-containing flame retardant and the metal organosulfonate are preferable. When the phosphorus-containing flame retardant (B-1) is used as the (B) flame retardant, the polycarbonate resin composition will be improved not only in the above-described performances, but also in the impact resistance in the process of high temperature molding, and in the fluidity. On the other hand, when the metal organosulfonate (B-2) is used as the (B) flame retardant, the polycarbonate resin composition will further be improved in the continuous productivity, and also in the heat resistance and die fouling preventive performance. The present invention is preferable from the environmental viewpoint, since the halogen-containing flame retardant may substantially be excluded. "Substantially excluded" herein means that the content is 0.0001% by mass or smaller of the total amount of the polycarbonate resin composition of the present invention.

[3-1. Phosphorus-Containing Flame Retardant (B-1)]

The polycarbonate resin composition of the present invention contains 3 to 30 parts by mass of the phosphorus-containing flame retardant (B), per 100 parts by mass of the polycarbonate resin (A). By containing the phosphorus-containing flame retardant in this way, the polycarbonate resin composition of the present invention will be improved in the flame resistance.

The phosphorus-containing flame retardant used in the present invention may be a compound containing phosphorus in the molecule thereof, and may be a low molecular weight substance, oligomer, or polymer. From the viewpoint of thermal stability, for example, phosphoric ester compound represented by the formula (1), and phosphazene compounds represented by the formulae (2) and (3) are particularly preferable.

[Chemical Formula 5]

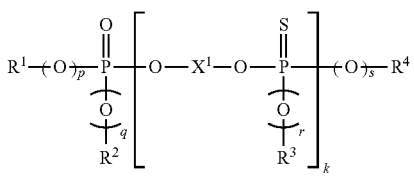

(1)

[In the formula (1), each of $R^1$, $R^2$, $R^3$ and $R^4$ independently represents a $C_{1-6}$ alkyl group, or a $C_{6-20}$ aryl group which may be substituted by an alkyl group, each of p, q, r and s is respectively 0 or 1, k denotes an integer of 1 to 5, and $X^1$ represents an arylene group.]

[Chemical Formula 6]

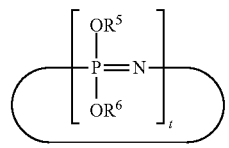

(2)

[In the formula (2), t denotes an integer of 3 to 25, $R^5$ and $R^6$ may be same or different, and each of which represents an aryl group or alkylaryl group.]

[Chemical Formula 7]

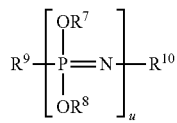

(3)

[In the formula (3), u denotes an integer of 3 to 10,000, $R^7$ represents at least one species selected from —N=P(OR$^7$)$_3$ group, —N=P(OR$^8$)$_2$ group, —N=P(O)OR$^7$ group, and —N=P(O)OR$^8$ group, and $R^{10}$ represents at least one species selected from —P(OR$^7$)$_4$ group, —P(OR$^8$)$_4$ group, —P(O)(OR$^7$)$_2$ group, and —P(O)(OR$^8$)$_2$ group. $R^7$ and $R^8$ may be same or, different, each of which represents an aryl group or alkylaryl group.]

The phosphoric ester compound represented by the formula (1) in the above may be a mixture of compounds having different values of k, wherein k will be understood as an average value of the different values of k of the condensed phosphoric esters. k is generally an integer of 0 to 5. When the compounds having different values of k are used, the average value of k is preferably in the range from 0.5 to 2, more preferably from 0.6 to 1.5, still more preferably from 0.8 to 1.2, and particularly preferably from 0.95 to 1.15.

$X^1$ represents a divalent arylene group, and examples of which include divalent groups derived from dihydroxy compounds, such as resorcinol, hydroquinone, bisphenol A, 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, and 2,7-dihydroxynaphthalene. Among them, the divalent groups derived from resorcinol, bisphenol A, and 3,3'-dihydroxybiphenyl are particularly preferable.

Each of p, q, r and s in the formula (1) denotes 0 or 1, and particularly preferably 1.

Each of $R^1$, $R^2$, $R^3$ and $R^4$ independently represents a $C_{1-6}$ alkyl group or $C_{6-20}$ aryl group which may be substituted by an alkyl group. Examples of this sort of aryl group include phenyl group, cresyl group, xylyl group, isopropylphenyl group, butylphenyl group, tert-butylphenyl group, di-tert-butylphenyl group, and p-cumylphenyl group. Among them, phenyl group, cresyl group, and xylyl group are more preferable.

Specific examples of the phosphoric ester compound represented by the formula (1) include aromatic phosphoric esters such as triphenyl phosphate (TPP), tricresyl phosphate (TCP), trixylenyl phosphate (TXP), cresyldiphenyl phosphate (CDP), 2-ethylhexyldiphenyl phosphate (EHDP), tert-butylphenyldiphenyl phosphate, bis(tert-butylphenyl)phenyl phosphate, tris(tert-butylphenyl)phosphate, isopropylphenyldiphenyl phosphate, bis(isopropylphenyl)diphenyl phosphate, and tris(isopropylphenyl)phosphate; and condensed phosphoric esters such as resorcinol bis-diphenyl phosphate (RDP), resorcinol bis-dixylenyl phosphate (RDX), bisphenol A bis-diphenyl phosphate (BDP), and biphenylbis-diphenyl phosphate.

The phosphoric ester compound represented by the formula (1) preferably has an acid value of 0.2 mg KOH/g or smaller, more preferably 0.15 mg KOH/g or smaller, still more preferably 0.1 mg KOH/g or smaller, and particularly preferably 0.05 mg KOH/g or smaller. Lower limit of the acid value may be set to substantially zero. On the other hand, content of half ester is more preferably 1.1 parts by mass or less, and still more preferably 0.9 parts by mass or less. The acid value exceeding 0.2 mg KOH/g or the half ester content exceeding 1.1 parts by mass may degrade the thermal stability or the hydrolytic resistance of the polycarbonate resin composition of the present invention.

Examples of the phosphoric ester compound used in the present invention, other than those described in the above, include of course 10-(2,5-dihydroxyphenyl)-10H-9-oxa-10-phosphaphenanthrene-10-oxide, 10-(2,3-dihydroxyphenyl)-10H-9-oxa-10-phosphaphenanthrene-10-oxide, 10-(2,4-dihydroxyphenyl)-10H-9-oxa-10-phosphaphenanthrene-10-oxide, polyester resin having a phosphoric ester moiety, polycarbonate resin, and epoxy resin.

Examples of the phosphazene compounds represented by the formulae (2) and (3) include cyclic and/or chain-like $C_{1-6}$ alkyl $C_{6-20}$ aryloxyphosphazene such as phenoxyphosphazene, (poly)tolyloxyphosphazene (for example, o-tolyloxyphosphazene, m-tolyloxyphosphazene, p-tolyloxyphosphazene, o,m-tolyloxyphosphazene, o,p-tolyloxyphosphazene, m,p-tolyloxyphosphazene, and o,m,p-tolyloxyphosphazene), and (poly)xylyloxyphosphazene; and cyclic and/or chain-like $C_{6-20}$ aryl $C_{1-10}$ alkyl $C_{6-20}$ aryloxyphosphazene such as (poly)phenoxytolyloxyphosphazene (for example, phenoxy-o-tolyloxyphosphazene, phenoxy-m-tolyloxyphosphazene, phenoxy-p-tolyloxyphosphazene, phenoxy-o,m-tolyloxyphosphazene, phenoxy-o,p-tolyloxyphosphazene, phenoxy-m,p-tolyloxyphosphazene, and phenoxy-o,m,p-tolyloxyphosphazene), (poly)phenoxyxylyloxyphosphazene, and (poly)phenoxytolyloxyxylyloxyphosphazene, wherein preferable examples include cyclic and/or chain-like phenoxyphosphazene, cyclic and/or chain-like $C_{1-3}$ alkyl $C_{6-20}$ aryloxyphosphazene, $C_{6-20}$ aryloxy $C_{1-3}$ alkyl $C_{6-20}$ aryloxyphosphazene (for example, cyclic and/or chain-like tolyloxyphosphazene, and cyclic and/or chain-like phenoxytolylphenoxyphosphazene).

In the cyclic phosphazene compound represented by the formula (2), $R^5$ and $R^6$ may be same or different, and respectively represent an aryl group or alkylaryl group. Examples of the aryl group or alkylaryl group include phenyl group, naphthyl group, methylphenyl group and benzyl group. Among them, cyclic phenoxyphosphazene in which of $R^5$ each and $R^6$ represents a phenyl group is particularly preferable. Examples of this sort of cyclic phenoxyphosphazene compound include phenoxycyclotriphosphazene, octaphenoxycyclotetraphosphazene, and decaphenoxycyclopentaphosphazene, which are obtained typically by allowing ammonium chloride and phosphorus pentachloride to react at 120 to 130° C. in the form of mixture of cyclic and straight-chain-like chlorophosphazenes, isolating therefrom cyclic chlorophosphazenes such as hexachlorocyclotriphosphazene, octachlorocyclotetraphosphazene, and decachlorocyclopentaphosphazene, and then by substituting the isolated cyclic chlorophosphazens with phenoxy groups.

In the formula (2), t denotes an integer of 3 to 25, wherein a preferable compound has t representing an integer of 3 to 8, or may be a mixture of compounds having different values of t. Among them, a preferable mixture contains 50% by mass or more of a compound having t=3, 10 to 40% by mass of a compound having t=4, and a total of 30% by mass or less of compounds having t=5 or above.

In the formula (3), $R^7$ and $R^8$ may be same or different, and respectively represent an aryl group or alkylaryl group. The aryl group or the alkylaryl group is exemplified by phenyl group, naphthyl group, methylphenyl group, and benzyl group, wherein chain-like phenoxyphosphazene in which each of $R^7$ and $R^8$ represents a phenyl group is particularly preferable. This sort of chain-like phenoxyphosphazene compound may be obtained by allowing hexachlorocyclotriphosphazene, obtained by the method described in the above, to proceed ring-opening polymerization at 220 to 250° C., and by substituting the resultant straight chain-like dichlorophosphazene having a degree of polymerization of 3 to 10,000 with phenoxy groups.

$R^9$ represents at least one species selected from —N=P(OR$^7$)$_3$ group, —N=P(OR$^8$)$_3$ group, —N=P(O)OR$^7$ group and —N=P(O)OR$^8$ group; and $R^{10}$ represents at least one species selected from —P(OR$^7$)$_4$ group, —P(OR$^8$)$_4$ group, —P(O)(OR$^7$)$_2$ group and —P(O)(OR$^8$)$_2$ group.

In the formula (3), u denotes an integer of 3 to 10,000, preferably 3 to 1,000, more preferably 3 to 100, and still more preferably 3 to 25.

The phosphazene compound used in the present invention may be a crosslinked phosphazene compound having a crosslinked moiety. The heat resistance tends to improve by incorporating this sort of crosslinked structure. Examples of the crosslinked phosphazene compound include compounds having crosslinked structures of 4,4'-diphenylene group, such as a compound having a crosslinked structure of 4,4'-sulfonyldiphenylene (bisphenol S residue), a compound having a crosslinked structure of 2,2-(4,4'-diphenylene)isopropylidene group, a compound having a crosslinked structure of 4,4'-oxydiphenylene group, and a compound having a crosslinked structure of 4,4'-thiodiphenylene group.

[Chemical Formula 8]

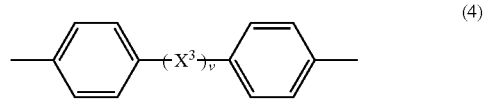

[In the formula (4), $X^3$ represents —C(CH$_3$)$_2$—, —SO$_2$—, —S—, or —O, and v is 0 or 1.]

Preferable examples of the crosslinked phosphazene compound include a crosslinked phenoxyphosphazene compound configured by the cyclic phenoxyphosphazene compound having phenyl groups as $R^5$ and $R^6$ in the formula (2), while being crosslinked by the crosslinking group represented by the formula (4); and a crosslinked phenoxyphosphazene compound configured by the chain-like phenoxyphosphazene compound having phenyl groups as $R^7$ and $R^8$ in the formula (3), while being crosslinked by the crosslinking group represented by the formula (4), from the viewpoint of flame resistance, wherein a crosslinked phenoxyphosphazene compound configured by the cyclic phenoxyphosphazene compound crosslinked by the crosslinking group represented by the formula (4) is more preferable.

Content of the phenylene group in the crosslinked phenoxyphosphazene compound is generally 50 to 99.9%, and preferably 70 to 90%, relative to the number of the total phenyl groups and phenylene groups in the cyclic phosphazene compound represented by the formula (2) and/or the chain-like phenoxyphosphazene compound represented by the formula (3). It is particularly preferable that the crosslinked phenoxyphosphazene compound does not contain free hydroxy group in the molecule thereof.

In the present invention, the phosphazene compound is preferably at least one species selected from the group consisting of the cyclic phenoxyphosphazene compound represented by the formula (2), and, the crosslinked phenoxyphosphazene compound configured by the chain-like phenoxyphosphazene compound represented by the formula (3), while being crosslinked by the crosslinking group, from the viewpoints of flame resistance and mechanical characteristics.

Content of the phosphorus-containing flame retardant (B-1), per 100 parts by mass of the polycarbonate resin (A), is 3 parts by mass or more, preferably 5 parts by mass or more, more preferably 8 parts by mass or more, on the other hand 30 parts by mass or less, preferably 25 parts by mass or less, and more preferably 20 parts by mass or less. The content of the phosphorus-containing flame retardant smaller than 3 parts by mass may result in only an insufficient flame resistance, whereas the content exceeding 30 parts by mass may considerably degrade the heat resistance and mechanical performances.

[3-2. Metal Organosulfonate (B-2)]

The polycarbonate resin composition of the present invention contains a metal organosulfonate. By containing the metal organosulfonate, the polycarbonate resin composition of the present invention will be improved in the flame resistance, Species of metal contained in the metal organosulfonate are exemplified by alkali metals such as lithium (Li), sodium (Na), potassium (K), rubidium (Rb) and cesium (Cs); alkali earth metals such as magnesium (Mg), calcium (Ca), strontium (Sr) and barium (Ba); and also by aluminum (Al), titanium (Ti), iron (Fe), cobalt (Co), nickel (Ni), copper (Cu), zinc (Zn), zirconium (Zr), molybdenum (Mo) and so forth. Among them, the alkali metals or alkali earth metals are preferable, since they may promote formation of a carbonized layer in the process of combustion of the polycarbonate resin composition of the present invention to thereby improve the flame resistance, while successfully maintaining the mechanical performances such as impact resistance, and other properties such as heat resistance and electrical property inherent to the polycarbonate resin. Accordingly, metal organosulfonate is preferably at least one species of metal salt compound selected from the group consisting of alkali metal salt and alkali earth metal salt. Among them, alkali metal salt is more preferable, and sodium, potassium and cesium are particularly preferable.

Examples of the metal organosulfonate include lithium organosulfonate, sodium (Na) organosulfonate, potassium (K) organosulfonate, rubidium (Rb) organosulfonate, cesium (Cs) organosulfonate, magnesium (Mg) organosulfonate, calcium (Ca) organosulfonate, strontium (Sr) organosulfonate and barium (Ba) organosulfonate. Among them, alkali metal organosulfonate such as sodium (Na) organosulfonate, potassium (K) organosulfonate compound, and cesium (Cs) organosulfonate compound are particularly preferable.

Preferable examples of the metal organosulfonate include metal salts of fluorine-containing aliphatic sulfonic acid, metal salts of fluorine-containing aliphatic sulfonic acid imide, metal salts of aromatic sulfonic acid, and metal salts of aromatic sulfonamide. Among them, particularly preferable examples include alkali metal salts of fluorine-containing aliphatic sulfonic acid having in the molecule thereof at least one C—F bond, such as potassium perfluorobutanesulfonate, lithium perfluorobutanesulfonate, sodium perfluorobutanesulfonate, cesium perfluorobutanesulfonate, lithium trifluoromethanesulfonate, sodium trifluoromethanesulfonate, potassium trifluoromethanesulfonate, potassium perfluoroethanesulfonate, and potassium perfluoropropanesulfonate;

alkali earth metal salts of fluorine-containing aliphatic sulfonic acid having in the molecule thereof at least one C—F bond, such as magnesium perfluorobutanesulfonate, calcium perfluorobutanesulfonate, barium perfluorobutanesulfonate, magnesium trifluoromethanesulfonate, calcium trifluoromethanesulfonate, and barium trifluoromethanesulfonate;

metal salts of fluorine-containing aliphatic sulfonic acid, typically alkali metal salts of fluorine-containing aliphatic disulfonate having in the molecule thereof at least one C—F bond, such as disodium perfluoromethanedisulfonate, dipotassium perfluoromethanedisulfonate, disodium perfluoroethanedisulfonate, dipotassium perfluoroethanedisulfonate, dipotassium perfluoropropanedisulfonate, dipotassium perfluoroiso propanedisulfonate, disodium perfluorobutanedisulfonate, dipotassium perfluorobutanedisulfonate, and dipotassium perfluorooctanedisulfonate;

alkali metal salts of fluorine-containing aliphatic disulfonimide having in the molecule thereof at least one C—F bond, such as lithium bis(perfluoropropanesulfonyl)imide, sodium bis(perfluoropropanesulfonyl)imide, potassium bis(perfluoropropanesulfonyl)imide, lithium bis(perfluorobutanesulfonyl)imide, sodium bis(perfluorobutanesulfonyl)imide, potassium bis(perfluorobutanesulfonyl)imide, potassium trifluoromethane(pentafluoroethane)sulfonylimide, sodium trifluoromethane(nonafluorobutane)sulfonylimide, potassium trifluoromethane(nonafluorobutane)sulfonylimide, and trifluoromethane;

metal salts of fluorine-containing aliphatic sulfonimide, typically alkali metal salts of cyclic fluorine-containing aliphatic sulfonimide having in the molecule thereof at least one C—F bond, such as lithium cyclo-hexafluoropropane-1,3-bis (sulfonyl)imide, sodium cyclo-hexafluoropropane-1,3-bis (sulfonyl)imide, and potassium cyclo-hexafluoropropane-1, 3-bis(sulfonyl)imide;

alkali metal salts of aromatic sulfonic acid having in the molecule thereof at least one aromatic group, such as dipotassium diphenylsulfone-3,3'-disulfonate, potassium diphenylsulfone-3-sulfonate, sodium benzenesulfonate, sodium (poly)styrenesulfonate, sodium paratoluenesulfonate, sodium (branched) dodecylbenzenesulfonate, sodium trichlorobenzenesulfonate, potassium benzenesulfonate, potassium styrenesulfonate, potassium (poly)styrenesulfonate, potassium paratoluenesulfonate, potassium (branched) dodecylbenzenesulfonate, potassium trichlorobenzenesulfonate, cesium benzenesulfonate, cesium (poly) styrenesulfonate, cesium paratoluenesulfonate, cesium (branched) dodecylbenzenesulfonate, and cesium trichlorobenzenesulfonate;

metal aromatic sulfonates, typically alkali earth metal salts of aromatic sulfonic acid having at least one species of aromatic group in the molecule thereof, such as magnesium paratoluenesulfonate, calcium paratoluenesulfonate, strontium paratoluenesulfonate, barium paratoluenesulfonate, magnesium (branched)dodecylbenzenesulfonate, and calcium (branched) dodecylbenzenesulfonate; and metal salts of aromatic sulfoneamide, typically alkali metal salts of aromatic sulfoneamide having at least one species of aromatic group in the molecule thereof, such as sodium salt of saccharin, potassium salt of N-(p-tolylsulfonyl)-p-toluenesulfonimide, potassium salt of N—(N'-benzylaminocarbonyl)sulfanylimide, and potassium salt, of N-(phenylcarboxyl)-sulfanylimide.

Among the species exemplified in the above, metal salt of fluorine-containing aliphatic sulfonic acid, and metal salt of aromatic sulfonic acid are more preferable, and metal salt of fluorine-containing aliphatic sulfonic acid is particularly preferable.

The metal salt of fluorine-containing aliphatic sulfonic acid is preferably alkali metal salt of fluorine-containing aliphatic sulfonic acid having at least one C—F bond in the molecule thereof, more preferably alkali metal salt of perfluoroalkane sulfonic acid, specifically exemplified by potassium perfluorobutanesulfonate. Preferable examples of the metal salt of aromatic sulfonic acid include alkali metal salt of aromatic sulfonic acid; more preferable examples include alkali metal salts of diphenylsulfone-sulfonic acid, such as dipotassium diphenylsulfone-3,3'-disulfonate, and potassium diphenylsulfone-3-sulfonate; and alkali metal salts of paratoluenesulfonic acid, such as sodium paratoluenesulfonate, potassium paratoluenesulfonate, and cesium paratoluenesulfonate. Among them, alkali metal salts of paratoluenesulfonic acid are particularly preferable.

The metal organosulfonate used herein may be a single species, or an arbitrary combination of two or more species according to an arbitrary ratio of mixing.

Besides the above-described metal organosulfonate, also polymer-form metal organosulfonate may be used as the metal organosulfonate in the present invention. Examples of this sort of polymer-form metal organosulfonate include metal salts having alkali metal sulfonate residues incorporated into thermoplastic resins such as polystyrene, polyacrylonitrile-styrene, polycarbonate, and polyethylene terephthalate.

Content of the metal organosulfonate in the polycarbonate resin composition of the present invention is 0.001 parts by mass or more, per 100 parts by mass of polycarbonate resin, preferably 0.01 parts by mass or more, more preferably 0.03 parts by mass or more, and particularly preferably 0.05 parts by mass or more, on the other hand 1 part by mass or less, preferably 0.5 parts by mass or less, more preferably 0.3 parts by mass or less, and particularly preferably 0.15 parts by mass or less. Too small content of the metal organosulfonate may result in only an insufficient flame resistance of the polycarbonate resin composition, whereas too much content may degrade the thermal stability of the polycarbonate resin composition, and may also degrade the appearance and mechanical strength of the molded article.

[4. Fluoropolymer (C)]

The polycarbonate resin composition of the present invention contains 0.001 to 1 part by mass of the fluoropolymer (D) per 100 parts by mass of the polycarbonate resin (A). Species of the fluoropolymer used herein is not specifically limited, and may be a single species, or an arbitrary combination of two or more species according to an arbitrary ratio of mixing.

Examples of the fluoropolymer include fluoroolefin resin. The fluoroolefin resin is generally a polymer or a copolymer containing a fluoroethylene structure. Specific examples include difluoroethylene resin, tetrafluoroethylene resin, tetrafluoroethylene/hexafluoropropylene copolymer resin, and tetrafluoroethylene/perfluoroalkylvinyl ether copolymer resin. Among them, tetrafluoroethylene resin is preferable. The fluoroethylene resin may be exemplified by fibrillatable fluoroethylene resin.

The fibrillatable fluoroethylene resin is available, for example, as "Teflon (registered trademark) 6J" and "Teflon (registered trademark) 640J" from DuPont-Mitsui Fluorochemicals Co., Ltd.; and "Polyflon F201L", "Polyflon F103" and "Polyflon FA500B" from Daikin Industries, Ltd. Water-base dispersion of the fluoroethylene resin is commercially available as "Teflon (registered trademark) 30J" and "Teflon (registered trademark) 31-JR" from DuPont-Mitsui Fluorochemicals Co., Ltd.; and "Fluon D-1" from Daikin Industries, Ltd. Also the fluoroethylene polymer, having a multi-layered structure polymerized with a vinyl-based monomer, may be used. Examples of this sort of fluoroethylene polymer include polystyrene-fluoroethylene composite, polystyrene-acrylonitrile-fluoroethylene composite, poly(methyl methacrylate)-fluoroethylene composite, and poly(butyl methacrylate)-fluoroethylene composite, and they may be available, for example, as "Metablen A-3800" from Mitsubishi Rayon Co. Ltd., and "Blendex 449" from GE Specialty Chemicals. The anti-dripping agent contained herein may be a single species, or an arbitrary combination of two or more species according to an arbitrary ratio of mixing.

Content of the fluoropolymer, per 100 parts by mass of the polycarbonate resin, is generally 0.001 parts by mass or more, preferably 0.01 parts by mass or more, more preferably 0.05 parts by mass or more, and particularly preferably 0.1 parts by mass or more, on the other hand, generally 1 part by mass or less, preferably 0.75 parts by mass or less, and more preferably 0.5 parts by mass or less. The content of fluoropolymer below the lower limit value of the above-described range may result in only an insufficient effect of improvement in the flame resistance by the fluoropolymer, whereas the content of fluoropolymer exceeding the upper limit value of the above-described range may degrade the appearance and mechanical strength of the molded article of the polycarbonate resin composition.

[5. Graft Copolymer (D)]

The graft copolymer used in the present invention is obtained by introducing a (meth)acrylate ester compound into a diene-based rubber by graft polymerization, and has (i) a sulfur content of 100 to 1,500 ppm, and (ii) an average particle size of 70 to 240 nm.

By selecting this sort of specific graft copolymer, the polycarbonate resin composition excellent in the flame resistance, impact resistance, hue, and color fastness may be obtained. If the phosphorus-containing flame retardant is used as the (B) flame retardant, not only the above-described properties, but also the fire retardant property, and impact resistance in the process of high temperature molding may be improved. On the other hand, if the metal organosulfonate is used as the (B) flame retardant, still also the continuous productivity may be improved.

Examples of the diene-based rubber, contained in the graft copolymer used in the present invention, include butadiene-based rubbers represented by copolymers configured by butadiene compounds such as polybutadiene, (partially) hydrogenated polybutadiene, and butadiene-based rubbers such as copolymer formed between butadiene and one or more species of vinyl-based monomers co-polymerizable with butadiene, such as butadiene-styrene copolymer, (partially) hydrogenated polybutadiene-styrene copolymer, butadiene-styrene block copolymer, (partially) hydrogenated polybutadiene-styrene block copolymer, butadiene-acrylonitrile copolymer, and acryl-based rubber copolymer mainly composed of butadiene-isobutyl acrylate; and isobutylene-based rubbers such as polyisobutylene, polyisobutylene-styrene copolymer, and polyisobutylene-styrene block copolymer. Among them, butadiene-based rubber is preferable.

In particular, in the present invention, content of the butadiene-derived components in the diene-based rubber is preferably 80% by mass or more. In other words, butadiene preferably accounts for 80% by mass or more of the source monomers.

Particularly preferable examples of the butadiene-based rubber include polybutadiene, butadiene-styrene copolymer, and butadiene-styrene block copolymer, which are obtainable by co-polymerizing 75 to 100 parts by mass of 1,3-butadiene with 0 to 25 parts by mass of one or more species of vinyl-based monomers co-polymerizable with 1,3-butadiene, wherein the smaller the styrene content, the better, since a large styrene content may degrade the flame resistance and fire retardant property of the polycarbonate resin composition of the present invention.

The butadiene-based rubber used in the present invention is more preferably polybutadiene, butadiene-styrene copolymer, and butadiene-styrene block copolymer, which are obtainable by co-polymerizing 95 to 100% by mass of 1,3-butadiene, with 0 to 5% by mass of one or more species of vinyl-based monomer copolymerizable with 1,3-butadiene, and is particularly preferably polybutadiene which is composed of substantially 100% by mass of 1,3-butadiene. "Substantially 100 parts by mass of polybutadiene" herein means a rubber solely composed of butadiene, but may contain very small amounts of other components for the purpose of improving the thermal stability of the rubber-like polymer or improving controllability of particle size. Contents of the other components herein are generally 5% by mass or less of the butadiene-based rubber, preferably 3% by mass or less, and more preferably 1% by mass or less.

In the graft copolymer used in the present invention, examples of the (meth)acrylate ester compound to be introduced into the diene-based rubber by graft polymerization include alkyl methacrylates such as methyl methacrylate, ethyl methacrylate, and n-butyl acrylate; aryl methacrylates such as phenyl methacrylate, and naphthyl methacrylate; and glycidyl group-containing methacrylates such as glycidyl acrylate, and glycidyl methacrylate. Among them, the alkyl methacrylates are preferable in view of good balance between the heat resistance and the polycarbonate resin, and methyl methacrylate is more preferable.

The (meth)acrylate ester compound used herein may be a single species, or combination of two or more species.

Besides the above-described (meth)acrylate ester compounds, other vinyl-based monomers may be contained as required. Examples of the other vinyl-based monomers include aromatic vinyls such as styrene, and α-methylstyrene;

unsaturated nitriles such as acrylonitrile, and methacrylonitrile;

vinyl ethers such as methyl vinyl ether, and butyl vinyl ether; maleimide compounds such as maleimide, N-methylmaleimide, and N-phenylmaleimide; and α,β-unsaturated carboxylic acid compounds such as maleic acid, phthalic acid, itaconic acid, and unhydrides thereof (maleic unhydride, for example).

It is also possible to concomitantly use crosslinkable monomers which are exemplified by aromatic multi-functional vinyl compounds such as divinylbenzene, and divinyltoluene;

polyvalent alcohols such as ethylene glycol dimethacrylate, and 1,3-butanediol diacrylate;

carboxylic acid allyl esters such as trimethacrylic acid ester, triacrylic acid ester, allyl acrylate, and allyl methacrylate; and di- and triallyl compounds such as diallyl phthalate, diallyl sebacate, and triallyltriazine.

Content of the diene-based rubber in the graft copolymer used in the present invention is generally 50 to 95% by mass of the total 100% by mass of the diene-based rubber, (meth)acrylate ester compound, other monomers and crosslinkable monomer, preferably 70 to 90% by mass, and more preferably 75 to 85% by mass.

The content of the diene-based rubber below the above-described lower limit value is not desirable, since the impact resistance and flame resistance of the polycarbonate resin composition of the present invention may degrade. On the other hand, the content of the diene-based rubber exceeding the above-described upper limit value is again not desirable, since the impact resistance and flame resistance may degrade.

Content of the (meth)acrylate ester compound to be incorporated into the diene-based rubber by graft copolymerization is generally 50 to 100% by mass of the total 100% by mass of the (meth)acrylate ester compound, other monomers and the crosslinkable monomer, preferably 75 to 100% by mass, and more preferably 90 to 100% by mass.

Content of the (meth)acrylate ester compound below the lower limit value is not desirable since it may degrade the impact resistance and flame resistance of the polycarbonate resin composition of the present invention. On the other hand, also content of the (meth)acrylate ester compound exceeding the upper limit value is not desirable since it may again degrade the impact resistance and flame resistance.

Method of producing the graft copolymer used in the present invention is not specifically limited, and may be any of bulk polymerization, solution polymerization, suspension polymerization, and emulsion polymerization; and mode of copolymerization may be based on one-step grafting or multi-step grafting. From the viewpoint of productivity and controllability of particle size, emulsion polymerization is preferable, and multi-step emulsion polymerization is more preferable. The multi-step emulsion polymerization is exemplified by the method of polymerization described, for example, in JP-A-2003-261629.

The graft copolymer used in the present invention is preferably a core/shell type graft copolymer, from the viewpoints of readiness of improving the impact resistance, flame resistance, and appearance.

The graft copolymer used in the present invention generally has a sulfur content of 100 to 1,500 ppm. The sulfur content below the above-described lower limit value tends to degrade the heat resistance of the graft copolymer, whereas the sulfur content exceeding the upper limit value is undesirable since it may considerably degrade the flame resistance, hue, color fastness, and hygrothermal stability of the polycarbonate resin composition of the present invention.

From these points of view, the sulfur content is more preferably 200 to 1,000 ppm, still more preferably 300 to 800 ppm, and most preferably 400 to 700 ppm.

The sulfur content of the graft copolymer used in the present invention is mainly ascribable to sulfur contained in emulsifier, dispersion aid, polymerization initiator, thermal stabilizer and so forth, which are used in the process of production of the graft copolymer or pulverization, and examples of which include inorganic sulfate, organic sulfonate, mercaptan compound, and thio ether compound.

The graft copolymer having the above-described range of sulfur content may be obtained by once producing the graft copolymer, and then by removing the sulfur-containing components in the process of washing, pulverization and so forth.

Too much sulfur content may degrade the hue or color fastness, due to formation of colorants specific to the sulfur compounds, whereas too small content may lower the heat resistance of the graft copolymer in itself, and may thereby degrade the impact resistance of the polycarbonate resin composition.

The sulfur content may be determined by the combustion ion chromatography. More specifically, a sample is combusted using a combustion system AQF-100 from Mitsubishi Chemical Analytech Co. Ltd., under conditions including temperature: 900 to 1000° C., purge gas: oxygen at 600 ml/min, combustion time 8 min, absorbing liquid: 0.09% aqueous hydrogen peroxide, 25 ml. Amount of sulfate ion ($SO_4^{2-}$) was measured using an ion chromatography apparatus ICS-90 from Dionex Corporation, under conditions including column: IonPac AS12A, eluent: 2.7 mM $Na_2CO_3$+ 0.3 mM $NaHCO_3$, regenerant: 15 mM $H_2SO_4$, flow rate: 1.3 ml/min, analytical time: 20 min, and the result was converted into amount of sulfur (S).

The graft copolymer used in the present invention has an average particle size of 70 to 240 nm. The average particle size below the above-described lower limit value may result in only an insufficient impact resistance of the polycarbonate resin composition of the present invention. On the other hand, the average particle size exceeding the above-described upper limit value is undesirable, since it may degrade the flame resistance and fire retardant property of the polycarbonate resin composition of the present invention, also the impact resistance in the process of molding, and still also the initial hue. From these points of view, the lower limit value is preferably 80 nm, more preferably 90 nm, still more preferably 100 nm or larger, and particularly preferably 120 nm or larger. The upper limit value is preferably 220 nm or smaller, more preferably 190 nm or smaller, still more preferably 180 nm or smaller, furthermore preferably 170 nm or smaller, and particularly preferably 160 nm or smaller. The impact resistance in the process of high temperature molding is likely to improve effectively when the graft copolymer (D) has an average particle size of 100 to 180 nm.

In particular, since the polycarbonate resin is a less combustible resin, so that combustion of the polycarbonate resin added with the graft copolymer will exponentially be accelerated in the graft polymer moiety. The present invention now adopts the graft polymer having an average particle size of 240 nm or smaller, so as to finely distribute it into the polycarbonate resin, in other words, so as to finely divide exothermic energy during combustion, to thereby successfully suppress heat generation as a whole.

The average particle size herein may be determined based on volume-average particle size D50 obtained when the graft copolymer solution after the polymerization is measured by the dynamic light scattering process. The measurement may be conducted using, for example, "Microtrac particle size analyzer 9230UPA" available from Nikkiso Co. Ltd.

Content of the graft copolymer, per 100 parts by mass of polycarbonate resin, is generally 0.5 parts by mass or more, preferably 1 part by mass or more, more preferably 3 parts by mass or more, and still more preferably 4 parts by mass or more, on the other hand, generally 10 parts by mass or less, preferably 8 parts by mass or less, and more preferably 6 parts by mass or less. The content of graft copolymer below the lower limit value of the above-described range may result in only an insufficient impact resistance of the polycarbonate resin composition of the present invention, whereas the content of graft copolymer exceeding the upper limit value of the above-described range is undesirable, since it may considerably degrade the flame resistance, fire retardant property, impact resistance and hue.

[6. Stabilizer]

The polycarbonate resin composition of the present invention may contain a stabilizer. Content of the stabilizer is generally 0.001 parts by mass or more per 100% by mass of the polycarbonate resin, preferably 0.01 parts by mass or more, on the other hand, generally 1 part by mass or less, and preferably 0.5 parts by mass or less.

Preferable examples of the stabilizer include phosphorus-containing stabilizer, and phenolic stabilizer.

[6-1. Phosphorus-Containing Stabilizer]

The polycarbonate resin composition of the present invention preferably contains a phosphorus-containing stabilizer depending on needs. By containing the phosphorus-containing stabilizer, the polycarbonate resin composition of the present invention will be improved in the hue, and also in the color fastness and continuous productivity. This effect is effectively expressed particularly when the metal organosulfonate (B-2) is used as the flame retardant.

The phosphorus-containing stabilizer adoptable herein may be any of publicly-known ones. Specific examples include oxoacids such as phosphoric acid, phosphoric acid, phosphorus acid, phosphinic acid, and polyphosphorus acid; metal salts of acid pyrophosphate such as sodium acid pyrophosphate, potassium acid pyrophosphate, and calcium acid pyrophosphate; phosphate of Group I or Group 2B metal such as potassium phosphate, sodium phosphate, cesium phosphate, and zinc phosphate; phosphate compound, phosphite compound, and phosphonite compound. Among them, the phosphite compound is particularly preferable. By selecting the phosphite compound, the polycarbonate resin composition will have more excellent color fastness and continuous productivity.

The phosphite compound herein means a trivalent phosphorus compound represented by the formula $P(OR)_3$, where R represents a monovalent or divalent organic group. Examples of this sort of phosphite compound include triphenyl phosphite, tris(mononyl/dinonylphenyl)phosphite, tris(2,4-di-tert-butylphenyl)phosphite, monooctyl diphenyl phosphite, dioctyl monophenyl phosphite, monodecyldiphenyl phosphite, didecylmonophenyl phosphite, tridecyl phosphite, trilauryl phosphite, tristearyl phosphite, distearyl pentaerythritoldiphosphite, bis(2,4-di-tert-butyl-4-methylphenyl)pentaerythritol phosphite, bis(2,6-di-tert-butylphenyl)octyl phosphite, 2,2-methylenebis(4,6-di-tert-butylphenyl)octyl phosphite, tetrakis(2,4-di-tert-butylphenyl)-4,4'-biphenylene diphosphite, and 6-[3-(3-tert-butyl-hydroxy-5-methylphenyl)propoxy]-2,4,8,10-tetra-tert-butyldibenzo[d,f][1,3,2]dioxaphosphepin.

Among these phosphite compounds, more preferable examples include aromatic phosphite compounds represented by the formulae (5) and/or (6), in view of effectively improving the color fastness of the polycarbonate resin composition of the present invention.

[Chemical Formula 9]

(5)

[In the formula (5), each of $R^1$, $R^2$ and $R^3$ represents a $C_{6-30}$ aryl group. $R^1$, $R^2$ and $R^3$ may be same or different.]

[Chemical Formula 10]

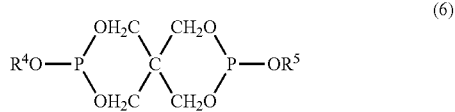

(6)

[In the formula (6), each of $R^4$ and $R^5$ represents a $C_6$ or larger, and $C_{30}$ or smaller aryl group. $R^4$ and $R^5$ may be same or different.]

The phosphite compound represented by the formula (5) is preferably triphenyl phosphite, tris(monononylphenyl)phosphite, and tris(2,4-di-tert-butylphenyl)phosphite. Among them, tris(2,4-di-tert-butylphenyl)phosphite is more preferable. These sorts of organic phosphite compound may be available as "Adekastab 1178" from ADEKA Corporation; "Sumilizer TNP" from Sumitomo Chemical Co. Ltd.; "JP-351" from Johoku Chemical Co. Ltd.; "Adekastab 2112" from ADEKA Corporation; "Irgafos 168" from Ciba Specialty Chemicals Corporation; and "JP-650" from Johoku Chemical Co. Ltd.

The phosphite compound represented by the formula (6) is preferably bis(2,4-di-tert-butyl-4-methylphenyl)pentaerythritol phosphite, and more preferably bis(2,6-di-tert-butylphenyl)octyl phosphite. These sorts of organic phosphite compound are available, for example, as "Adekastab PEP-24G" and "Adekastab PEP-36" from ADEKA Corporation.

The phosphorus-containing stabilizer contained herein may be a single species, or an arbitrary combination of two or more species according to an arbitrary ratio of mixing.

Content of the phosphorus-containing stabilizer, per 100 parts by mass of polycarbonate resin is generally 0.001 parts by mass or more, preferably 0.01 parts by mass or more, and more preferably 0.03 parts by mass or more, on the other hand generally 0.5 parts by mass or less, more preferably 0.3 parts by mass or less, and more preferably 0.1 parts by mass or less. The content of phosphorus-containing stabilizer below the above-described lower limit value may result in only insufficient levels of hue, color fastness and continuous productivity, whereas the content of phosphorus-containing stabilizer exceeding the above-described upper limit value may not only degrade the color fastness but also tend to degrade the hygrothermal stability.

[6-2. Phenolic Stabilizer]

The phenolic stabilizer is exemplified by hindered phenolic antioxidant, examples of which include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylene bis[3-(3,5-di-tert-butyl-4-hydroxyphenyl) propionate], N,N'-(hexane-1,6-diyl)bis[3-(3,5-di-tert-butyl-4-hydroxyphenyl)propionamide], 2,4-dimethyl-6-(1-methylpentadecyl)phenol, diethyl[[3,5-bis(1,1-dimethylethyl)-4-hydroxyphenyl]methyl]phosphate, 3,3',3",5,5',5"-hexa-tert-butyl-a,a',a"-(mesitylene-2,4,6-triyl)tri-p-cresol, 4,6-bis (octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl) propionate], 1,3,5-tris(3,5-di-tert-butyl-4-hydroxybenzyl)-1, 3,5-triazine-2,4,6(1H,3H,5H)-trione, 2,6-di-tert-butyl-4-(4, 6-bis(octylthio)-1,3,5-triazine-2-ylamino)phenol, and 2-[1-(2-hydroxy-3,5-di-tert-pentylphenyl)ethyl]-4,6-di-tert-pentylphenyl acrylate.

Among them, pentaerythritol tetrakis[3-(3,5-di-tert-butyl-4-hydroxyphenyl)propionate], and octadecyl-3-(3,5-di-tert-butyl-4-hydroxyphenyl)propionate are preferable. These sorts of phenolic antioxidant are commercially available for example as "Irganox 1010" and "Irganox 1076" from Ciba Specialty Chemicals Corporation, and as "Adekastab AO-50" and "Adekastab AO-60" from ADEKA Corporation.

The phenolic stabilizer may be contained alone, or in arbitrary combinations or two or more species according to arbitrary ratios of mixing.

Content of the phenolic stabilizer, per 100 parts by mass of polycarbonate resin, is generally 0.001 parts by mass or more, preferably 0.01 parts by mass or more, on the other hand generally 1 part by mass or less, and preferably 0.5 parts by mass or less. The content of phenolic stabilizer below the lower limit value of the above-described range may result in only an insufficient effect of phenolic stabilizer, whereas the content exceeding the upper limit value of the above-described range may degrade the economy due to saturation of the effect.

[7. Lubricant]

Lubricant is exemplified by aliphatic carboxylic acid, ester formed by aliphatic carboxylic acid and alcohol, aliphatic hydrocarbon compound having a number-average molecular weight of 200 to 15,000, and polysiloxane-based silicone oil.

The aliphatic carboxylic acid is exemplified by saturated or unsaturated aliphatic monovalent, divalent or trivalent carboxylic acid. The aliphatic carboxylic acid herein include alicyclic carboxylic acid. Preferable examples of the aliphatic carboxylic acid include $C_{6-36}$ monovalent or divalent carboxylic acid, and more preferable examples include aliphatic saturated monovalent carboxylic acid. Specific examples of the aliphatic carboxylic acid include palmitic acid, stearic acid, caproic acid, capric acid, lauric acid, arachic acid, behenic acid, lignoceric acid, cerotic acid, mellisic acid, tetratriacontanic acid, montanic acid, adipic acid, and azelaic acid.

The aliphatic carboxylic acid composing the ester formed by aliphatic carboxylic acid and alcohol may be same as the above-described aliphatic carboxylic acid. On the other hand, the alcohol is exemplified by saturated or unsaturated, monovalent or polyvalent alcohol. The alcohol may have a substituent such as fluorine atom, aryl group or the like. The substituent is preferably a $C_{30}$ or shorter monovalent or polyvalent saturated alcohol, and more preferably a $C_{30}$ or shorter aliphatic saturated monovalent alcohol or aliphatic saturated polyvalent alcohol. Note that "aliphatic" herein also covers alicyclic compound.

Specific examples of the alcohol include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol.

The ester may contain aliphatic carboxylic acid and/or alcohol as an impurity. The ester may be a pure substance, or may be a mixture of a plurality of compounds. In addition, each of the aliphatic carboxylic acid and the alcohol used herein, which bind to configure a single ester, may be a single species, or an arbitrary combination of two or more species according to an arbitrary ratio of mixing.

Specific examples of the ester formed by the aliphatic carboxylic acid and the alcohol include beeswax (mixture mainly composed of myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetrastearate.

Examples of the aliphatic hydrocarbon having a number-average molecular weight of 200 to 15,000 include liquid paraffin, paraffin wax, micro wax, polyethylene wax, Fischer-Tropsch wax, and $C_{3-12}$ α-olefin oligomer. The aliphatic hydrocarbon herein also includes alicyclic hydrocarbon. These hydrocarbons may partially be oxidized.

Among them, paraffin wax, polyethylene wax and partially oxidized product of polyethylene wax are preferable, and paraffin wax and polyethylene wax are more preferable.

The aliphatic hydrocarbon preferably has a number-average molecular weight of 5,000 or smaller.

The aliphatic hydrocarbon may be a single substance, or may be a mixture of various constituents having a variety of molecular weights, provided that the major constituents falls in the above-described ranges.

The polysiloxane-based silicone oil is exemplified by dimethyl silicone oil, methylphenyl silicone oil, diphenyl silicone oil, and fluorinated alkyl silicone.

The lubricant contained herein may be a single species, or an arbitrary combination of two or more species according to an arbitrary ratio of mixing.

Content of the lubricant, per 100 parts by mass of polycarbonate resin, is generally 0.001 parts by mass or more, preferably 0.01 parts by mass or more, on the other hand generally 2 parts by mass or less, and preferably 1 part by mass or less. The content of lubricant below the lower limit value of the above-described range may result in only an insufficient mold releasing effect, whereas the content exceeding the upper limit value of the above-described range may degrade the hydrolytic resistance, and may foul an injection-molding die.

[8. Titanium Oxide]

The polycarbonate resin composition of the present invention may preferably contain titanium oxide treated with a siloxane compound. By incorporating such specific titanium oxide, the color fastness and continuous productivity may further be improved.

Titanium oxide used in the present invention is not specifically limited with respect to method of manufacturing, crystal form, average particle size and so forth. Known methods of manufacturing of titanium oxide include sulfuric acid process and chlorine process, wherein the product of the chlorine process is more preferable in view of effectively achieving the purpose of the present invention, since the product of the sulfuric acid process tends to degrade whiteness of the composition added therewith, to thereby degrade colorability.

Known crystal form of titanium oxide include rutile and anatase, wherein rutile is preferable from the viewpoint of light stability. Average particle size of the titanium oxide-based additive is preferably 0.1 to 0.7 μm, and more preferably 0.1 to 0.4 μm. The average particle size of smaller than 0.1 μm may result in only a poor light shielding performance of the molded article, and the average particle size exceeding 0.7 μm may cause surface imperfection of the molded article, or may degrade mechanical strength of the molded article. In the present invention, two or more species of titanium oxide, differing in the average particle size, may be used in a mixed manner.

Titanium oxide used in the present invention is characteristically treated with a siloxane compound. By the treatment with a siloxane compound, the polycarbonate resin composition of the present invention will be improved in the hue, color fastness and continuous productivity, and also in the thermal stability, impact resistance, hygrothermal stability and heat aging resistance.

Examples of the siloxane compound include silicone oil, silicone varnish and silicone resins which are composed of poly(dimethyl siloxane) or poly(methylphenylsiloxane); and reactive functional group-containing siloxane compounds having reactive functional groups, such as Si—H group, Si—OH group, Si—NH group and Si—OR group, capable of reacting with the surface of the inorganic compound particles. Among them, the reactive functional group-containing siloxane compounds are preferable, and Si—H group-containing siloxane compound, having Si—H group, is particularly preferable.

The Si—H group-containing siloxane compound is not specifically limited so long as it has Si—H groups in the molecule thereof, and may appropriately be selected and used. Among them, poly(organohydrogen siloxane) is preferable, examples of which include poly(methylhydrogen siloxane), polycyclo(methylhydrogen siloxane), poly(ethylhydrogen siloxane), poly(phenylhydrogen siloxane), poly[(methylhydrogen siloxane) (dimethylsiloxane)] copolymer, poly[(methylhydrogen siloxane)(ethylmethyl siloxane)] copolymer, poly[(methylhydrogen siloxane)(diethyl siloxane)] copolymer, poly[(methylhydrogen siloxane)(hexylmethylsiloxane)] copolymer, poly[(methylhydrogen siloxane) (octylmethyl siloxane)] copolymer, poly[(methylhydrogen siloxane)(phenylmethyl siloxane)] copolymer, poly[(methylhydrogen siloxane)(diethoxysiloxane)] copolymer, poly[(methylhydrogen siloxane)(dimethoxysiloxane)] copolymer, poly[(methylhydrogen siloxane)(3,3,3-trifluoropropylmethylsiloxane)] copolymer, poly[(dihydrogen siloxane)((2-methoxyethoxy)methylsiloxane)] copolymer, and poly[(dihydrogensiloxane)(phenoxymethylsiloxane)] copolymer.

Known methods of surface treatment of titanium oxide using the siloxane compound include (1) wet process and (2) dry process. The wet process is conducted by adding an alumina hydrate, and optionally a titanium oxide pretreated with a silicate hydrate, to a mixture of an siloxane-based surface modifier and a solvent, followed by stirring, desolvation, and annealing at 100 to 300° C. The dry process is exemplified by a method of mixing titanium oxide, similarly pretreated as described in the above, with a siloxane compound using a Henschel mixer or the like, and a method of coating the pretreated titanium oxide with an organic solvent solution of a siloxane by spraying, followed by annealing at 100 to 300° C.

Amount of use of the siloxane compound for treatment, per 100 parts by mass of titanium oxide, is generally 0.01 to 10 parts by mass. The amount of use for treatment below the above-described lower limit value result in only a small effect of surface treatment, and thereby the hue and color fastness of the polycarbonate resin composition of the present invention may degrade. On the other hand, the amount of use for treatment exceeding the above-described upper limit value is undesirable, since it may increase generation of gas from the polycarbonate resin composition of the present invention, and thereby cause fouling of the die or poor appearance of the molded article.

From these points of view, the amount of use for treatment, per 100 parts by mass of titanium oxide, is more preferably 0.1 to 6 parts by mass, still more preferably 0.5 to 5 parts by mass, and particularly preferably 1 to 4 parts by mass.

The titanium oxide is preferably pretreated using an alumina-based surface modifier, before being treated with the siloxane compound. Alumina hydrate is preferably used as the alumina-based surface modifier. It is also preferable to use silicate hydrate together with the alumina hydrate for the pretreatment. Method of pretreatment is arbitrary, without special limitation. Amount of use of alumina hydrate, optionally combined with silicate hydrate, for the pretreatment is preferably 1 to 15% by weight, relative to titanium oxide.

The titanium oxide pretreated with alumina oxide, optionally combined with silicate hydrate, may further be improved in the thermal stability, and in uniformity and stability of dispersion in the polycarbonate resin composition, if the surface thereof is further treated with a siloxane compound-based surface modifier.

Content of the titanium oxide, per 100 parts by mass of polycarbonate resin, is generally 0.01 parts by mass or more, preferably 0.05 parts by mass or more, more preferably 0.1 parts by mass or more, on the other hand, generally 15 parts by mass or less, preferably 6 parts by mass or less, and more preferably 4 parts by mass or less. The content of titanium oxide below the lower limit value of the above-described range may result in only an in sufficient effect of improving the color fastness, whereas the content of titanium oxide exceeding the upper limit value of the above-described range may degrade the impact resistance of the molded article obtained by molding the polycarbonate resin composition.

In general, the content of titanium oxide is selected while appropriately balancing the effects of improving the color fastness and continuous productivity, and desired hue.

[9. Other Ingredients]

The polycarbonate resin composition of the present invention may also contain ingredients other than those described in the above as required, so long as desired various characteristics will not be impaired. Examples of the other ingredients include resins other than polycarbonate resin, and various resin additives. The other ingredients contained herein may be a single species, or an arbitrary combination of two or more species according to an arbitrary ratio of mixing.

Other Resins

Examples of other resins include thermoplastic polyester resins such as polyethylene terephthalate resin, polytrimethylene terephthalate, and polybutylene terephthalate resin; styrene-based resins such as polystyrene resin, high impact polystyrene resin (HIPS), acrylonitrile-styrene copolymer (AS resin), acrylonitrile-styrene-acryl rubber copolymer (ASA resin), and acrylonitrile-ethylenepropylene-based rubber-styrene copolymer (AES resin); polyolefin resins such as polyethylene resin and polypropylene resin; polyamide resin; polyimide resin; polyetherimide resin; polyurethane resin;

polyphenylene ether resin; polyphenylene sulfide resin; polysulfone resin; and polymethacrylate resin.

The other resins contained herein may be a single species, or an arbitrary combination of two or more species according to an arbitrary ratio of mixing.

Resin Additives

Examples of resin additives include UV absorber, dyes and pigments, flame retardant, antistatic agent, anticlouding agent, antiblocking agent, fluidity modifier, plasticizer, dispersion aid, antibacterial agent, and mold releasing agent. The resin additives contained herein may be a single species, or an arbitrary combination of two or more species according to an arbitrary ratio of mixing.

The additives preferably used for the polycarbonate resin composition of the present invention will be detailed below.

UV Absorber

Examples of the UV absorber include inorganic UV absorbers such as cerium oxide and zinc oxide; and organic UV absorbers such as benzotriazole compound, benzophenone compound, salicylate compound, cyanoacrylate compound, triazine compound, oxanilide compound, malonic ester compound, and hindered amine compound. Among them, organic UV absorber is preferable, and benzotriazole compound is more preferable. By selecting the organic UV absorber, the polycarbonate resin composition of the present invention will be improved in the transparency and mechanical performances.

Specific examples of the benzotriazole compound include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole), 2-(2'-hydroxy-3',5'-di-tert-amyl)-benzotriazole, 2-(2'-hydroxy-5'-tert-octylphenyl)benzotriazole, and 2,2'-methylenebis[4-(1,1,3,3-tetramethylbutyl)-6-(2N-benzotriazole-2-yl)phenol]. Among them, 2-(2'-hydroxy-5'-tert-octylphenyl)benzotriazole, and 2,2'-methylenebis[4-(1,1,3,3-tetramethylbutyl)-6-(2N-benzotriazole-2-yl)phenol] are preferable, and 2-(2'-hydroxy-5'-tert-octylphenyl)benzotriazole is particularly preferable. These sorts of benzotriazole compound are available, for example, as "Seesorb 701", "Seesorb 705", "Seesorb 703", "Seesorb 702", "Seesorb 704" and "Seesorb 709" from Shiprokasei Kaisha, Ltd.; "Viosorb 520", "Viosorb 582", "Viosorb 580" and "Viosorb 583" from Kyodo Chemical Co. Ltd.; "Kemisorb 71" and "Kemisorb 72" from Chemipro Kasei Kaisha, Ltd.; "Cyasorb UV5411" from Cytec Industries Inc.; "LA-32", "LA-38", "LA-36", "LA-34" and "LA-31" from ADEKA Corporation; and "Tinuvin P", "Tinuvin 234", "Tinuvin 326", "Tinuvin 327" and "Tinuvin 328" from Ciba Specialty Chemicals Corporation.

Specific examples of the benzophenone compound include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dihydroxy-4-methoxybenzophenone, and 2,2'-dihydroxy-4,4'-dimethoxybenzophenone. These sorts of benzophenone compound are available, for example, as "Seesorb 100", "Seesorb 101", "Seesorb 101S", "Seesorb 102" and "Seesorb 103" from Shiprokasei Kaisha, Ltd.; "Viosorb 100", "Viosorb 110" and "Viosorb 130" from Kyodo Chemical Co. Ltd.; "Kemisorb 10", "Kemisorb 11", "Kemisorb 11S", "Kemisorb 12", "Kemisorb 13" and "Kemisorb 111" from Chemipro Kasei Kaisha, Ltd.; "Uvinul 400", "Uvinul M-40" and "Uvinul MS-40" from BASF; "Cyasorb UV9", "Cyasorb UV284", "Cyasorb UV531" and "Cyasorb UV24" from Cytec Industries Inc.; and "Adekastab 1413" and "Adekastab LA-51" from ADEKA Corporation.

Specific examples of the salicylate compound include phenyl salicylate and 4-tert-butylphenyl salicylate. These sorts of salicylate compound are available, for example, as "Seesorb 201" and "Seesorb 202" from Shiprokasei Kaisha, Ltd.; and "Kemisorb 21" and "Kemisorb 22" from Chemipro Kasei Kaisha, Ltd.

Specific examples of the cyanoacrylate compound include ethyl-2-cyano-3,3-diphenyl acrylate, and 2-ethylhexyl-2-cyano-3,3-diphenyl acrylate. These sorts of cyanoacrylate compound are available, for example, as "Seesorb 501" from Shiprokasei Kaisha, Ltd.; "Viosorb 910" from Kyodo Chemical Co. Ltd.; "Uvisolator 300" from Daiichi Kasei Co. Ltd.; and "Uvinul N-35" and "Uvinul N-539" from BASF.

Examples of the triazine compound include those having a 1,3,5-triazine skeleton. These sorts of triazine compound are available, for example, as "LA-46" from ADEKA Corporation; and "Tinuvin 1577ED", "Tinuvin 400", "Tinuvin 405", "Tinuvin 460", "Tinuvin 477-DW" and "Tinuvin 479" from Ciba Specialty Chemicals Corporation.

Specific examples of the oxanilide compound include 2-ethoxy-2'-ethyloxanilic acid bisanilide. This sort of oxanilide compound is available, for example, as "Sanduvor VSU" from Clariant.

The malonic ester compound is preferably 2-(alkylidene) malonic ester, and more preferably 2-(1-arylalkylidene)malonic ester. These sorts of malonic ester compound is available, for example, as "PR-25" from Clariant Japan, and "B-CAP" from Ciba Specialty Chemicals Corporation.

Content of the UV absorber, per 100 parts by mass of the polycarbonate resin, is generally 0.01 parts by mass or more, preferably 0.1 parts by mass or more, on the other hand, generally 3 parts by mass or less, and preferably 1 part by mass or less. Content of the UV absorber below the lower limit value of the above-described range may result in only an insufficient effect of improving the weather resistance, whereas the content of UV absorber exceeding the upper limit value of the above-described range may induce mold deposit to thereby foul the die. The UV absorber used herein may be a single species, or an arbitrary combination of two or more species according to an arbitrary ratio of mixing.

Dyes and Pigments Other than Titanium Oxide

Examples of dyes and pigments other than titanium oxide include inorganic pigment, organic pigment, and organic dye.

Examples of the inorganic pigment include sulfide-based pigments such as cadmium red, and cadmium yellow; silicate-based pigments such as ultramarine; oxide-based pigments such as titanium oxide, zinc oxide, red iron oxide, chromium oxide, iron black, titanium yellow, zinc-iron-based brown, titanium cobalt-based green, cobalt green, cobalt blue, copper-chromium-based black, and copper-iron-based black; chromate-based pigments such as chrome yellow, and molybdate orange; and ferrocyanide-based pigments such as prussian blue.

Examples of the organic pigment and organic dyes include phthalocyanine-based dyes and pigments such as copper phthalocyanine blue, and copper phthalocyanine green; azo-based dyes and pigments such as nickel azo yellow; condensed polycyclic dyes and pigments such as thioindigo-based, perinone-based, perylene-based, quinacridone-based, dioxazine-based, isoindolinone-based, and quinophthalone-based compounds; and dyes and pigments such as anthraquinone-based, heterocyclic, and methyl-based compounds.

Among them, titanium oxide, cyanine-based, quinoline-containing, anthraquinone-based, and phthalocyanine-based compound are preferable, from the viewpoint of thermal stability.

The dyes and pigments contained herein may be a single species, or an arbitrary combination of two or more species according to an arbitrary ratio of mixing.

Contents of the dyes and pigments, per 100 parts by mass of polycarbonate resin, are generally 5 parts by mass or less, preferably 3 parts by mass or less, and more preferably 2 parts by mass or less. Too much content of dyes and pigments may result in only an insufficient impact resistance.

[10. Method of Production of the Polycarbonate Resin Composition]

Method of production of the polycarbonate resin composition of the present invention may be widely selectable from the publicly-known methods, without special limitation.

One exemplary method is such as preliminarily mixing the polycarbonate resin of the present invention with an organic phosphorus-containing flame retardant, and with other optional ingredients combined as required, using a tumbler, Henschel mixer, or any of various types of mixers, and then melting and kneading the mixture using a mixer such as Banbury mixer, roll, Brabender, single-screw kneader/extruder, double-screw kneader/extruder, kneader or the like.

The polycarbonate resin composition of the present invention may alternatively be prepared without preliminarily mixing the individual ingredients, or by preliminarily mixing only a part of the ingredients, then by feeding the mixture using a feeder to an extruder and then melting and kneading the mixture therein.

Still alternatively, a part of the ingredients may be preliminarily mixed and fed to an extruder, melted and kneaded therein to prepare a resin composition called master batch, then the master batch may be mixed again with the residual ingredient(s), followed by melting and kneading, to thereby prepare the polycarbonate resin composition of the present invention.

For an exemplary case where a less-dispersible ingredient is mixed, dispersibility may be improved by preliminarily dissolving or dispersing such less-dispersible ingredient into a solvent such as water or organic solvent, followed by kneading with the thus-obtained solution or dispersion.

[11. Molded Article]

The polycarbonate resin composition of the present invention is generally used in the form of molded article (resin composition molded article) having an arbitrary geometry. Geometry, pattern, color, size and so forth of the molded article are arbitrarily selectable depending on applications of the molded article, without special limitation.

Examples of the molded article include electric/electronic appliances, OA appliances, information terminal apparatus, mechanical components, home appliances, vehicle components, building materials, various containers, goods/sundries for leisure-time amusement, and lighting equipment. Among them, electric/electronic appliances, OA appliances, information terminal apparatus, home appliances, and lighting equipment are preferable applications; and parts and sheet components of electric/electronic appliances and lighting equipment are particularly preferable applications.

Examples of the electric/electronic appliances include display devices such as personal computer, game machine, television, electronic paper; and also printer, copying machine, scanner, facsimile, electronic organizer, PDA, electronic desktop calculator, electronic dictionary, camera, video camera, mobile phone, battery pack, drive or reading device of recording media, mouse, ten-key, CD player, MD player, and portable radio/audio player. Among them, the molded article is preferably applicable to battery packs of portable appliances represented by notebook-sized personal computer, mobile phone, camera, and video camera.

Method of manufacturing the molded article is arbitrarily selectable from those having been generally adopted to the processes using the polycarbonate resin composition, without special limitation. Examples of the method include hollow molding processes such as injection-molding, ultrahigh speed injection-molding, injection compression molding, double molding, and gas assisted molding; and also include molding method using insulated runner mold, molding method using rapid heating die, foam molding (including supercritical fluid), insert molding, IMC (in-mold coating) molding, extrusion molding, sheet molding, thermoforming, rotational molding, laminate molding, and press molding. Molding method using a hot runner system is also adoptable.

The obtained molded article of the present invention may be used as a highly practical one having excellent flame resistance and mechanical performances, without losing the excellent properties inherent to the polycarbonate resin as described in the above.

The smaller the heat generation rate, measured using a cone calorimeter based on the oxygen-consumption calorimetry, of the molded article of the present invention is, the better, since it means larger fire retardant property. More specifically, the maximum value (maximum heat generation rate) measured using a 1-mm thick flat plate test piece is preferably 350 kW/m$^2$ or smaller, and the average value (average heat generation rate) measured using a 1-mm thick flat plate test piece is preferably 200 kW/m$^2$ or smaller.

EXAMPLES

The present invention will further be detailed, referring to Examples. It is to be understood that the present invention is not limited to the Examples below, and may be modified without departing from the spirit of the present invention. Note that the term "part(s)" in the explanation below means "part(s) by mass" on the basis of mass, unless otherwise specifically noted.

[Manufacturing of Resin Pellet]

The individual ingredients listed in Tables described later were mixed according to the ratio (by mass) again listed in Tables, in a tumbler for 20 minutes. The mixture was then fed to a single-vented, double-screw extruder (TEX30HSST) from Japan Steel Works, Ltd., kneaded under conditions including a number of rotation of screw of 200 rpm, a rate of ejection of 15 kg/hour, and a barrel temperature of 280° C. The molten resin extruded in a strand form was rapidly cooled in a water bath, and pelletized using a pelletizer, to thereby obtain the pellets of the polycarbonate resin composition.

[Manufacturing of Test Pieces]

The pellets obtained by the above-described method of manufacturing were dried at 80° C. for 5 hours, and then molded by injection-molding using an injection-molding machine Model SE100DU from Sumitomo Heavy Industries, Ltd., under conditions including a cylinder temperature of 260° C., a die temperature of 80° C., and a molding cycle of 30 seconds, to thereby obtain 125 mm (length)×13 mm (width)×0.75 mm (thickness) test pieces for the UL test.

Alternatively, the pellets obtained by the above-described method of manufacturing were dried at 80° C. for 5 hours, and then molded by injection-molding using an injection-molding machine Cycap M-2 from Sumitomo Heavy Industries, Ltd., under conditions including a clamping force of 75 T, a cylinder temperature of 280° C. and 330° C., and a die temperature of 80° C., to thereby obtain ISO multi-purpose test pieces (3 mm thick).

Still alternatively, the pellets obtained by the above-described method of manufacturing were dried at 80° C. for 5 hours, and then molded by injection-molding using an injection-molding machine SH100 from Sumitomo Heavy Industries, Ltd., under conditions including a clamping force of 100 T, a cylinder temperature of 280° C., and a die temperature of 80° C., to thereby obtain 100 mm (length)×100 mm (width)×1 mm (thickness) flat plate test pieces (flat plate test pieces 1).

Still alternatively, the pellets obtained by the above-described method of manufacturing were dried at 120° C. for 5 hours, and then molded by injection-molding using an injection-molding machine Model J50-EP from Japan Steel Works, Ltd., under conditions including a cylinder temperature of 280° C., and a die temperature of 80° C., to thereby obtain 90 mm×50 mm×3 mm flat plate test pieces (flat plate test pieces 2).

[Evaluation of Flame Resistance]

The individual polycarbonate resin compositions, obtained by the methods described in the above, were conditioned in a thermostat chamber at a temperature of 23° C. and a humidity of 50% for 48 hours, and the flame resistance was evaluated conforming to UL94 (the Standard for Safety of Flammability of Plastic Materials for Parts in Devices and Appliances Testing) specified by the American Underwriters Laboratories (UL). UL94 specifies a method of evaluating flame resistance of a test piece of a predetermined size, which is held vertically and brought into contact with flame of burner for 10 seconds, based on afterflame time and dripping tendency. In order to achieve the flame resistance classes V-0, V-1 and V-2, it is necessary to satisfy the criteria shown in Table 1 below.

TABLE 1

|  | V-0 | V-1 | V-2 |
| --- | --- | --- | --- |
| Afterflame time of samples | ≦10 sec | ≦30 sec | ≦30 sec |
| Total afterflame time of 5 samples | ≦50 sec | ≦250 sec | ≦250 sec |
| Ignition of cotton induced by dripping | No | No | Yes |

The afterflame time herein means length of time over which the test piece keeps flamy combustion even after an ignition source was brought away. Ignition of cotton induced by dripping is determined by the fact whether a cotton indicator located approximately 300 mm below the lower edge of the test piece is ignited or not by a drip from the test piece. The samples was judged to fail in satisfying V-2, and evaluated as NR (not rated), if even only one sample, out of five samples, did not satisfy the above-described criteria. The afterflame time was expressed as "UL flame resistance" in Tables below.

[Evaluation of Heat Generation Rate]

The maximum heat generation rate and the average heat generation rate of the above-described flat plate test pieces 1 (1 mm thick) were measured using a cone calorimeter Model "IIIC3" from Toyo Seiki Seisaku-Sho, Ltd., based on the oxygen-consumption calorimetry. Test time was 300 seconds, and the average heat generation rate was determined by an average value of heat generation rate observed over a 60 second duration after the ignition. The smaller the maximum heat generation rate and average heat generation rate is, the better, since the smallness means larger fire protection performance. They were expressed as "maximum heat generation rate" and the "average heat generation rate", respectively in Tables below.

[Evaluation of Impact Resistance]

Charpy notched impact resistance (in kJ/m$^2$) of the ISO multi-purpose test pieces (3 mm thick) obtained by the method described in the above were measured at 23° C., conforming to ISO179, making a notch of R=0.25. The test was denoted as "Charpy" in Tables below.

[Evaluation of Hue]

YI value of the above-described flat plate test pieces 1 (1 mm thick) or flat plate test pieces 2 (3 mm thick) was measured conforming to JIS K-7105, using a spectral colorimeter Model SE2000 from Nippon Denshoku Industries Co. Ltd., based on the reflection method. The YI value herein means "yellowing index", wherein the smaller the value is, the better the initial hue is, and also the larger the degree of freedom of coloration becomes.

Examples 1-1 to 1-10 and Comparative Examples 1-1 to 1-4 employed the flat plate test pieces 1, and the results were given in Tables below as "initial YI". Examples 2-1 to 2-9 and Comparative Examples 2-1 to 2-4 employed the flat plate test pieces 2, and the results were given in Tables below as "5 h-dried-product YI".

Color Fastness

Examples 1-1 to 1-10 and Comparative Examples 1-1 to 1-4

The flat plate test pieces 1 were aged using a hot air drier at 80° C. for 96 hours, and the hue was evaluated similarly as described in the above, and the YI values were determined. Also differences of hue (ΔYI) before and after the treatment were determined. They will be denoted as "post-thermal-aging YI" and "ΔYI" in Tables shown below.

Color Fastness

Examples 2-1 to 2-9, Comparative Examples 2-1 to 2-3

The flat plate test pieces 2 were aged using a hot air drier at 120° C. for 168 hours, and the hue was evaluated similarly as described in the above, and the YI values were determined. Also differences of hue (ΔYI) before and after the treatment were determined. They will be denoted as "post-168 h-thermal-aging YI" and "post-aging ΔYI" in Tables shown below. In the overall judgment of the color fastness, those showing values of post-aging ΔYI of 10 or smaller were indicated by "○", whereas those having the value exceeding 10 were indicted by "x".

[Evaluation of Continuous Productivity]

The pellets obtained by the method of manufacturing described in the above were dried at: 120° C. for 12 hours, and the flat plate test pieces 2 (90 mm×50 mm×3 mm) were molded under the conditions same as those in the above-described method.

Using the obtained test pieces, YI values were measured under conditions similar to those described in the above. Also difference in hue (ΔYI) as compared with the test pieces after dried for 5 hours was determined. In Tables 4 and 5, they will be denoted as "12 h-dried-product YI" and "post-12 h-drying ΔYI". In the overall judgment of the continuous productivity, those showing ΔYI, between the 5 h-dried-product and the 12 h-dried-product, of 3 or smaller were indicated by "○", and those showing values exceeding 3 were indicated by "x".

TABLE 2

| | Abbreviation | sample |
|---|---|---|
| Aromatic polycarbonate resin | (A-1) | Aromatic polycarbonate resin derived from bisphenol A prepared by interfacial polymerization process, viscosity average MW: 21000, trade name: lupilon (registered trademark) S3000, from Mitsubishi Engineering-Plastics Corporation |
| | (A-2) | Aromatic polycarbonate resin derived from bisphenol A prepared by interfacial polymerization process, viscosity average MW: 19500 |
| Phosphorus-containing flame retardant | (B1-1) | Resorcinol bis-2,6-xylenyl phosphate, trade name: PX-200, from Daihachi Chemical Industry Co. Ltd. |
| | (B1-2) | Bisphenol A bis-diphenyl phosphate, trade name: FP-700, from ADEKA Corporation |
| | (B1-3) | 4,4'-Bis(diphenylphosphoryl)-1,1-biphenyl, trade name: FP-800, from ADEKA Corporation |
| | (B1-4) | Cyclic phenoxyphosphazene, trade name: SPB-100, from Otsuka Chemical Co. Ltd. |
| | (B1-5) | Cyclic phenoxyphosphazene, trade name: Rabitle FP-110, from Fushimi Pharmaceutical Co. Ltd. |
| Metal organosulfonate | (B2-1) | Potassium perfluorobutanesulfonate, trade name: Bayowet C4, from Lanxess |
| | (B2-2) | Potassium trifluoromethanesulfonate |
| Fluoropolymer | (C) | Fibrillatable fluoropolymer, trade name: FA-500B, from Daikin Industries, Ltd. |

TABLE 3

| | Abbreviation | Sample |
|---|---|---|
| Graft copolymer | (D1) | Core/shell type graft copolymer composed of a core made of rubber with a butadiene content of substantially 100% by mass, and a shell made of methyl methacrylate, sulfur content: 620 ppm, average particle size: 135 nm |
| | (D2) | Core/shell type graft copolymer composed of a core made of rubber with a butadiene content of substantially 100% by mass, and a shell made of methyl methacrylate, sulfur content: 630 ppm, average particle size: 155 nm |
| | (D3) | Core/shell type graft copolymer composed of a core made of rubber with a butadiene content of substantially 100% by mass, and a shell made of methyl methacrylate, sulfur content: 560 ppm, average particle size: 207 nm |
| | (D4) | Core/shell type graft copolymer composed of a core made of rubber with a butadiene content of substantially 100% by mass, and a shell made of methyl methacrylate, sulfur content: 550 ppm, average particle size: 257 nm |
| | (D5) | Core/shell type graft copolymer composed of a core made of rubber with a butadiene content of substantially 100% by mass, and a shell made of methyl methacrylate, sulfur content: 1,790 ppm, average particle size: 200 nm |
| | (D6) | Core/shell type graft copolymer composed of a core made of rubber with a butadiene content of substantially 100% by mass, and a shell made of methyl methacrylate, sulfur content: 680 ppm, average particle size: 150 nm |

TABLE 4

| | Abbreviation | |
|---|---|---|
| Other ingredients | (E1) | Thermal stabilizer (phosphorus-containing stabilizer) tris(2,4-di-tert-butylphenyl) phosphite trade name: Adekastab 2112, from ADEKA Corporation |
| | (E2) | Thermal stabilizer (phosphorus-containing stabilizer) bis(2,6-di-tert-butyl-4-methylphenyl)pentaerythritol phosphite trade name: Adekastab PEP-36, from ADEKA Corporation |
| | (E3) | Thermal stabilizer (phosphorus-containing stabilizer) 2,2-methylenebis(4,6-di-tert-butylphenyl)octyl phosphite trade name: Adekastab HP-10, from ADEKA Corporation |
| | (E4) | Thermal stabilizer (phenolic stabilizer) octadecyl-3-(3,5-di-tert-butyl-4-hydroxyphenyl)propionate trade name: Irganox 1076, from Ciba |
| | (E5) | Thermal stabilizer (phenolic stabilizer) pentaerythritol tetrakis[3-(3,5-di-tert-butyl-4-hydroxyphenyl)propionate] trade name: Irganox 1010, from Ciba |
| | (E6) | Lubricant stearyl sterate trade name: Unister M9676, from NOF Corporation |
| | (E7) | Lubricant aliphatic carboxylic acid derivative, pentaerythritol tetrastearate trade name: VPG861, from Cognis Japan |
| | (E8) | Titanium oxide siloxane-treated titanium oxide obtained by modifying the surface of titanium oxide from Sakai Chemical Industry Co. Ltd. (trade name: SR-1) by the dry process, using 3% by mass of poly(methylhydrogen siloxane) from Dow Corning Toray Co. Ltd. (trade name: SH1107) |

TABLE 5

| | Abbreviation | Unit | Example 1-1 | Example 1-2 | Example 1-3 | Comparative Example 1-1 | Comparative Example 1-2 |
|---|---|---|---|---|---|---|---|
| Resin composition | A-1 | parts by mass | 84.47 | 84.47 | 84.47 | 84.47 | 84.47 |
| | B1-1 | | 10 | 10 | 10 | 10 | 10 |
| | B1-2 | | | | | | |
| | B1-3 | | | | | | |
| | B1-4 | | | | | | |
| | C | | 0.3 | 0.3 | 0.3 | 0.3 | 0.3 |
| | D1 | | 5 | | | | |
| | D2 | | | 5 | | | |
| | D3 | | | | 5 | | |
| | D4 | | | | | 5 | |
| | D5 | | | | | | 5 |
| | E1 | | 0.03 | 0.03 | 0.03 | 0.03 | 0.03 |
| | E4 | | 0.05 | 0.05 | 0.05 | 0.05 | 0.05 |

TABLE 5-continued

| | Abbreviation | Unit | Example 1-1 | Example 1-2 | Example 1-3 | Comparative Example 1-1 | Comparative Example 1-2 |
|---|---|---|---|---|---|---|---|
| | E6 | | 0.075 | 0.075 | 0.075 | 0.075 | 0.075 |
| | E7 | | 0.075 | 0.075 | 0.075 | 0.075 | 0.075 |
| UL flame resistance | | | V-0 | V-0 | V-0 | V-2 | V-2 |
| Maximum heat generation rate | | kW/m$^2$ | 301.5 | 338.1 | 311.4 | 358.3 | 385.6 |
| Average heat generation rate | | | 183.5 | 199.2 | 183.4 | 205.8 | 216.8 |
| Charpy, 280° C. | | kJ/m$^2$ | 48.1 | 47.4 | 54.0 | 56.3 | 52.4 |
| Charpy, 330° C. | | | 55.1 | 50.8 | 22.9 | 39.5 | 26.9 |
| Initial YI | | | 1.95 | 2.00 | 4.45 | 5.34 | 7.00 |
| Post-thermal-aging YI | | | 6.98 | 5.93 | 5.97 | 7.97 | 14.69 |
| ΔYI | | | 2.53 | 3.93 | 4.02 | 2.63 | 7.69 |

TABLE 6

| | Abbreviation | Unit | Example 1-4 | Example 1-5 | Example 1-6 | Comparative Example 1-3 | Comparative Example 1-4 |
|---|---|---|---|---|---|---|---|
| Resin composition | A-1 | parts by mass | 84.47 | 84.47 | 84.47 | 84.47 | 84.47 |
| | B1-1 | | | | | | |
| | B1-2 | | 10 | | | 10 | |
| | B1-3 | | | 10 | | | |
| | B1-4 | | | | 10 | | 10 |
| | C | | 0.3 | 0.3 | 0.3 | 0.3 | 0.3 |
| | D1 | | | | | | |
| | D2 | | | 5 | 5 | | |
| | D3 | | 5 | | | | |
| | D4 | | | | | | |
| | D5 | | | | | 5 | 5 |
| | E1 | | 0.03 | 0.03 | 0.03 | 0.03 | 0.03 |
| | E4 | | 0.05 | 0.05 | 0.05 | 0.05 | 0.05 |
| | E6 | | 0.075 | 0.075 | 0.075 | 0.075 | 0.075 |
| | E7 | | 0.075 | 0.075 | 0.075 | 0.075 | 0.075 |
| UL flame resistance | | | V-0 | V-0 | V-0 | V-2 | V-2 |
| Charpy, 280° C. | | kJ/m$^2$ | 54.0 | 48.8 | 56.2 | 50.2 | 58.8 |
| Charpy, 330° C. | | | 36.3 | 52.2 | 51.4 | 20.4 | 27.3 |
| Initial YI | | | 3.98 | 3.18 | 6.21 | 7.84 | 9.31 |
| Post-thermal-aging YI | | | 7.30 | 7.44 | 11.83 | 16.01 | 20.5 |
| ΔYI | | | 3.32 | 4.26 | 5.62 | 8.17 | 11.19 |

As is clearly known from Tables in the above, Examples were excellent in the flame resistance, fire retardant property, impact resistance, hue and color fastness, and also in the impact resistance in the process of high temperature molding. On the other hand, the graft copolymer having a large average particle size (Comparative Example 1-1) gave only insufficient levels of flame resistance, fire retardant property and initial hue, and, the graft copolymers having large sulfur contents (Comparative Examples 1-2 to 1-4) gave only insufficient levels of flame resistance, fire retardant property and initial hue, and also in the impact resistance in the process of high temperature molding.

TABLE 7

| | Abbreviation | Unit | Example 1-7 | Example 1-8 | Example 1-9 | Example 1-10 |
|---|---|---|---|---|---|---|
| Resin composition | A-1 | parts by mass | 84.47 | 86.47 | 86.47 | 84.47 |
| | B1-1 | | 8 | | | |
| | B1-2 | | | | | |
| | B1-3 | | | | | |
| | B1-4 | | | | | |
| | B1-5 | | 2 | 8 | 8 | 10 |
| | C | | 0.3 | 0.3 | 0.3 | 0.3 |
| | D1 | | | | | |
| | D2 | | | 5 | | |
| | D3 | | 5 | | 5 | |
| | D4 | | | | | |
| | D5 | | | | | |
| | D6 | | | | | 5 |
| | E1 | | 0.03 | 0.03 | 0.03 | 0.03 |
| | E4 | | 0.05 | 0.05 | 0.05 | 0.05 |
| | E6 | | 0.075 | 0.075 | 0.075 | 0.075 |
| | E7 | | 0.075 | 0.075 | 0.075 | 0.075 |
| UL flame resistance | | | V-0 | V-0 | V-0 | V-0 |
| Charpy, 280° C. | | kJ/m$^2$ | 56.4 | 54.4 | 57.8 | 45.5 |
| Charpy, 330° C. | | | 39.8 | 50.8 | 40.2 | 42.4 |
| Initial YI | | | 4.12 | 4.88 | 5.02 | 5.34 |
| Post-thermal-aging YI | | | 8.22 | 8.14 | 8.84 | 10.12 |
| ΔYI | | | 4.1 | 3.26 | 3.82 | 4.78 |

TABLE 8

| | Abbreviation | Unit | Example 2-1 | Example 2-2 | Example 2-3 | Example 2-4 | Example 2-5 | Example 2-6 | Comparative Example 2-1 | Comparative Example 2-2 |
|---|---|---|---|---|---|---|---|---|---|---|
| Resin composition | A-2 | parts by mass | 97.22 | 97.22 | 97.22 | 97.22 | 97.22 | 97.22 | 97.22 | 97.22 |
| | B2-1 | | 0.08 | 0.08 | 0.08 | 0.08 | 0.08 | | 0.08 | 0.08 |
| | B2-2 | | | | | | | 0.08 | | |
| | C | | 0.4 | 0.4 | 0.4 | 0.4 | 0.4 | 0.4 | 0.4 | 0.4 |
| | D1 | | 2 | | | | | | | |
| | D2 | | | 2 | | | | | | |
| | D3 | | | | 2 | 2 | 2 | 2 | | |
| | D4 | | | | | | | | 2 | |
| | D5 | | | | | | | | | 2 |
| | E1 | | 0.05 | 0.05 | 0.05 | | | 0.05 | 0.05 | 0.05 |
| | E2 | | | | | 0.05 | | | | |
| | E3 | | | | | | 0.05 | | | |
| | E5 | | 0.1 | 0.1 | 0.1 | 0.1 | 0.1 | 0.1 | 0.1 | 0.1 |
| | E6 | | 0.075 | 0.075 | 0.075 | 0.075 | 0.075 | 0.075 | 0.075 | 0.075 |
| | E7 | | 0.075 | 0.075 | 0.075 | 0.075 | 0.075 | 0.075 | 0.075 | 0.075 |
| UL flame resistance | | | V-0 | V-0 | V-0 | V-0 | V-0 | V-0 | V-2 | V-0 |
| Impact resistance | | | | | | | | | | |
| Charpy, 280° C. | | kJ/m² | 53 | 54 | 57 | 57 | 54 | 57 | 60 | 55 |
| Charpy, 330° C. | | | 40 | 42 | 32 | 23 | 20 | 35 | 22 | 28 |
| Color fastness | | | | | | | | | | |
| 5 h-Dried-product YI | | | 0.51 | 1.25 | 0.59 | 1.10 | 3.07 | 0.42 | 2.50 | 3.53 |
| Post-168 h-thermal-aging YI | | | 2.71 | 3.70 | 3.40 | 4.02 | 8.33 | 3.03 | 6.02 | 17.03 |
| ΔYI | | | 2.20 | 2.45 | 2.81 | 2.92 | 5.26 | 2.61 | 3.52 | 13.5 |
| Judge | | | ○ | ○ | ○ | ○ | ○ | ○ | ○ | x |
| Continuous productivity | | | | | | | | | | |
| 12 h-Dried-product YI | | | 1.41 | 2.45 | 1.79 | 2.85 | 5.28 | 1.52 | 4.90 | 6.89 |
| ΔYI | | | 0.90 | 1.20 | 1.20 | 1.75 | 2.21 | 1.10 | 2.40 | 3.36 |
| Judge | | | ○ | ○ | ○ | ○ | ○ | ○ | ○ | x |

TABLE 9

| | Abbreviation | Unit | Example 2-7 | Example 2-8 | Example 2-9 | Comparative Example 2-3 |
|---|---|---|---|---|---|---|
| Resin composition | A-2 | parts by mass | 97.22 | 97.22 | 85.22 | 97.22 |
| | B2-1 | | 0.08 | 0.08 | 0.08 | 0.08 |
| | B2-2 | | | | | |
| | C | | 0.4 | 0.4 | 0.4 | 0.4 |
| | D1 | | 2 | | | |
| | D2 | | | 2 | | |
| | D3 | | | | 2 | |
| | D4 | | | | | |
| | D5 | | | | | 2 |
| | E1 | | 0.05 | 0.05 | 0.05 | 0.05 |
| | E5 | | 0.1 | 0.1 | 0.1 | 0.1 |
| | E6 | | 0.075 | 0.075 | 0.075 | 0.075 |
| | E7 | | 0.075 | 0.075 | 0.075 | 0.075 |
| | E8 | | 0.6 | | 12 | 3 |
| UL flame resistance | | | V-0 | V-0 | V-0 | V-0 |
| Impact resistance | | | | | | |
| Charpy, 280° C. | | kJ/m² | 54 | 54 | 52 | 55 |
| Charpy, 330° C. | | | 30 | 25 | 26 | 30 |
| color fastness | | | | | | |
| 5 h-Dried-product YI | | | 2.19 | 2.95 | 1.32 | 6.51 |
| Post-168 h-thermal-aging YI | | | 2.64 | 3.24 | 1.35 | 15.87 |
| ΔYI | | | 0.45 | 0.29 | 0.03 | 9.36 |
| Judge | | | ○ | ○ | ○ | x |
| Continuous productivity | | | | | | |
| 12 h-Dried-product YI | | | 2.57 | 3.14 | 1.40 | 9.73 |
| ΔYI | | | 0.38 | 0.19 | 0.08 | 3.22 |
| Judge | | | ○ | ○ | ○ | x |

The invention claimed is:

1. A polycarbonate resin composition containing, per 100 parts by mass of polycarbonate resin (A), 0.001 to 30 parts by mass of flame retardant (B), 0.001 to 1 part by mass of fluoropolymer (C), and 0.5 to 10 parts by mass of graft copolymer (D) obtainable by graft-copolymerizing a diene-based rubber with a (meth)acrylate ester compound,
the graft copolymer (D) having (i) a sulfur content of 100 to 1500 ppm, and (ii) an average particle size of 70 to 240 nm.

2. The polycarbonate resin composition of claim 1, wherein, in the graft copolymer (D), content of a butadiene-derived component in the diene-based rubber is 80% by mass or more.

3. The polycarbonate resin composition of claim 1, wherein 1 to 10 parts by mass of the graft copolymer (D) is contained per 100 parts by mass of polycarbonate resin.

4. The polycarbonate resin composition of claim 1, wherein sulfur content of the graft copolymer (D) is 300 to 800 ppm.

5. The polycarbonate resin composition of claim 1, containing 3 to 30 parts by mass of phosphorus-containing flame retardant (B-1) as the flame retardant, per 100 parts by mass of polycarbonate resin (A).

6. The polycarbonate resin composition of claim 5, wherein the phosphorus-containing flame retardant (B-1) is represented by the formula (1) below:

[Chemical Formula 1]

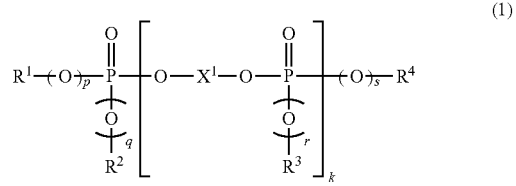

(1)

[in the formula (1), each of $R^1$, $R^2$, $R^3$ and $R^4$ independently represents a $C_{1-6}$ alkyl group or a $C_{6-20}$ aryl group which may be substituted by an alkyl group, each of p, q, r and s independently represents 0 or 1, k is an integer of 1 to 5, and $X^1$ represents an arylene group.]

7. The polycarbonate resin composition of claim 5, wherein the phosphorus-containing flame retardant (B-1) is a phosphazene compound represented by the formulae (2) and/or (3) below:

[Chemical Formula 2]

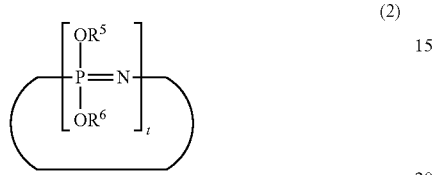

(2)

[in the formula (2), t is an integer of 3 to 25, $R^5$ and $R^6$ may be same or different, and each of which represents an aryl group or alkylaryl group],

[Chemical Formula 3]

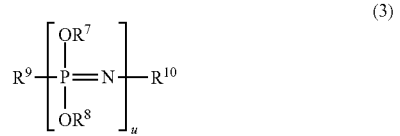

(3)

[in the formula (3), u is an integer of 3 to 10,000, $R^9$ represents at least one species selected from —N=P(OR$^7$)$_3$ group, —N=P(OR$^8$)$_3$ group, —N=P(O)OR$^7$ group and —N=P(O)OR$^8$ group, and $R^{10}$ represents at least one species selected from —P(OR$^7$)$_4$ group, —P(OR$^8$)$_4$ group, —P(O)(OR$^7$)$_2$ group and —P(O)(OR$^8$)$_2$ group, $R^7$ and $R^8$ may be same or different, and each of which represents an aryl group or alkylaryl group.]

8. The polycarbonate resin composition of claim 1, containing 0.001 to 1 part by mass of metal organosulfonate (B-2) as the flame retardant, per 100 parts by mass of polycarbonate resin (A).

9. The polycarbonate resin composition of claim 8, wherein the metal organosulfonate (B-2) is an alkali metal salt of fluorine-containing aliphatic sulfonic acid.

10. The polycarbonate resin composition of claim 8, wherein the metal organosulfonate (B-2) is an alkali metal salt of perfluoroalkanesulfonic acid.

11. The polycarbonate resin composition of claim 1, wherein average particle size of the graft copolymer (D) is 100 to 180 nm.

12. The polycarbonate resin composition of claim 1, wherein graft copolymer (D) is obtainable by graft-copolymerizing a diene-based rubber with at least methyl methacrylate.

13. A molded article obtainable by molding the polycarbonate resin composition described in claim 1.

14. The molded article of claim 13, being a battery pack container.

15. The polycarbonate resin composition of claim 2, wherein 1 to 10 parts by mass of the graft copolymer (D) is contained per 100 parts by mass of polycarbonate resin.

16. The polycarbonate resin composition of claim 2, wherein sulfur content of the graft copolymer (D) is 300 to 800 ppm.

17. The polycarbonate resin composition of claim 3, wherein sulfur content of the graft copolymer (D) is 300 to 800 ppm.

18. The polycarbonate resin composition of claim 2, containing 3 to 30 parts by mass of phosphorus-containing flame retardant (B-1) as the flame retardant, per 100 parts by mass of polycarbonate resin (A).

19. The polycarbonate resin composition of claim 3, containing 3 to 30 parts by mass of phosphorus-containing flame retardant (B-1) as the flame retardant, per 100 parts by mass of polycarbonate resin (A).

20. The polycarbonate resin composition of claim 4, containing 3 to 30 parts by mass of phosphorus-containing flame retardant (B-1) as the flame retardant, per 100 parts by mass of polycarbonate resin (A).

* * * * *